US012380606B2

(12) United States Patent
Ozkan et al.

(10) Patent No.: US 12,380,606 B2
(45) Date of Patent: Aug. 5, 2025

(54) COMPRESSION AND DECOMPRESSION OF SUB-PRIMITIVE PRESENCE INDICATIONS FOR USE IN A RENDERING SYSTEM

(71) Applicant: Imagination Technologies Limited, Kings Langley (GB)

(72) Inventors: Alper Ozkan, Hertfordshire (GB); Simon Fenney, St Albans (GB)

(73) Assignee: Imagination Technologies Limited, Kings Langley (GB)

( * ) Notice: Subject to any disclaimer, the term of this patent is extended or adjusted under 35 U.S.C. 154(b) by 162 days.

(21) Appl. No.: 18/202,995

(22) Filed: May 29, 2023

(65) Prior Publication Data

US 2024/0127485 A1    Apr. 18, 2024

(30) Foreign Application Priority Data

May 30, 2022 (GB) ..................................... 2207937
May 30, 2022 (GB) ..................................... 2207942

(51) Int. Cl.
| | |
|---|---|
| *G06T 9/00* | (2006.01) |
| *G06T 9/40* | (2006.01) |
| *G06T 15/06* | (2011.01) |

(52) U.S. Cl.
CPC ................ *G06T 9/001* (2013.01); *G06T 9/00* (2013.01); *G06T 9/40* (2013.01); *G06T 15/06* (2013.01); *G06T 2210/21* (2013.01)

(58) Field of Classification Search
None
See application file for complete search history.

(56) References Cited

U.S. PATENT DOCUMENTS

| | | | |
|---|---|---|---|
| 10,891,784 B2 * | 1/2021 | Dore | G06T 7/50 |
| 11,030,783 B1 * | 6/2021 | Engh-Halstvedt | G06T 15/40 |

(Continued)

FOREIGN PATENT DOCUMENTS

GB    2599185 A    8/2022

OTHER PUBLICATIONS

Gruen et al; "Sub-triangle opacity masks for faster ray tracing of transparent objects"; Proc. ACM Comput. Graph. Interact. Tech., vol. 3; No. 2; Aug. 26, 2020; pp. 1-12.

*Primary Examiner* — Nurun Flora
(74) *Attorney, Agent, or Firm* — Potomac Law Group, PLLC; Vincent M DeLuca

(57) ABSTRACT

A method and a compression unit are provided for compressing, into a block of compressed data, a block of sub-primitive presence indications for use in a rendering system. The block of sub-primitive presence indications is subdivided into a plurality of parent regions, each of the parent regions being subdivided into a plurality of child regions. A presence state is identified for each of the child regions based on the sub-primitive presence indications in the block of sub-primitive presence indications. A hierarchical representation of the block of sub-primitive presence indications is stored in the block of compressed data. For each of one or more parent regions whose child regions all have the same identified presence state, parent-level data is included in the hierarchical representation to represent the presence state of the parent region without child-level data for the child regions within the parent region being included in the hierarchical representation. For each of one or more parent regions whose child regions do not all have the same identified presence state, child-level data for the child regions within the parent region is included in the hierar- (Continued)

chical representation to represent the presence states for the child regions within the parent region.

20 Claims, 12 Drawing Sheets

(56) References Cited

U.S. PATENT DOCUMENTS

| | | |
|---|---|---|
| 11,282,260 B2 * | 3/2022 | Gupta .................... G06T 17/005 |
| 2011/0194613 A1 * | 8/2011 | Chen .................... H04N 19/176 |
| | | 375/E7.2 |
| 2015/0221127 A1 | 8/2015 | Howson |
| 2016/0247249 A1 | 8/2016 | Harris et al. |
| 2020/0051316 A1 | 2/2020 | Laine et al. |
| 2021/0201559 A1 | 7/2021 | Gruen |
| 2024/0020911 A1 * | 1/2024 | Norris ................. G06F 12/0857 |
| 2025/0095276 A1 * | 3/2025 | Muthler ................ G06T 17/005 |

\* cited by examiner

Example data L0 encoded data

COMPRESSION AND DECOMPRESSION OF SUB-PRIMITIVE PRESENCE INDICATIONS FOR USE IN A RENDERING SYSTEM

CROSS-REFERENCE TO RELATED APPLICATIONS AND CLAIM OF PRIORITY

This application claims foreign priority under 35 U.S.C. 119 from United Kingdom patent application Nos. GB2207942.0 filed on 30 May 2022 and GB2207937.0 filed on 30 May 2022 which are incorporated by reference herein in their entirety.

FIELD

The present disclosure is directed to techniques of compressing and/or decompressing sub-primitive presence indications for use in a rendering system.

BACKGROUND

Rendering systems can be used to generate an image of a scene. Two common rendering techniques are ray tracing and rasterization. In particular, ray tracing is a computational rendering technique for generating an image of a scene (e.g. a 3D scene) by tracing paths of light ('rays') usually from the viewpoint of a camera through the scene. Each ray is modelled as originating from the camera and passing through a pixel into the scene. As a ray traverses the scene it may intersect objects within the scene. The interaction between a ray and an object it intersects can be modelled to create realistic visual effects. For example, in response to determining an intersection of a ray with an object, a shader program (i.e. a portion of computer code) may be executed in respect of the intersection. A programmer can write the shader program to define how the system reacts to the intersection which may, for example cause one or more secondary rays to be emitted into the scene, e.g. to represent a reflection of the ray off the intersected object or a refraction of the ray through the object (e.g. if the object is transparent or translucent). As another example, the shader program could cause one or more rays to be emitted into the scene for the purposes of determining whether the object is in shadow at the intersection point. The result of executing the shader program (and processing the relevant secondary rays) can be the calculation of a colour value for the pixel the ray passed through.

Rendering an image of a scene using ray tracing may involve performing many intersection tests, e.g. billions of intersection tests for rendering an image of a scene. In order to reduce the number of intersection tests that need to be performed, ray tracing systems can generate acceleration structures, wherein each node of an acceleration structure represents a region within the scene. Acceleration structures are often hierarchical (e.g. having a tree structure) such that they include multiple levels of nodes, wherein nodes near the top of the acceleration structure represent relatively large regions in the scene (e.g. the root node may represent the whole scene), and nodes near the bottom of the acceleration structure represent relatively small regions in the scene. Leaf nodes of the acceleration structure represent regions bounding at least one primitive, or part of a primitive, in the scene, and have pointers to the bounded primitives.

Intersection testing can be performed for a ray (e.g. in a recursive manner) using the acceleration structure by first testing the ray for intersection with the root node of the acceleration structure. If the ray is found to intersect a parent node (e.g. the root node), testing can then proceed to the child nodes of that parent. In contrast, if the ray is found not to intersect a parent node, intersection testing of the child nodes of that parent node can be avoided, saving computational effort. If a ray is found to intersect a leaf node then it can be tested against the objects within the region represented by the leaf node to thereby determine which object(s) the ray intersects with. The objects may be represented using "primitives". A primitive denotes a unit of geometry in the system, and may for example be a convex polygon. Often the primitives are triangles, but they may be other shapes, e.g. rectangles (the term "rectangle" is used herein to include "square"), pentagons, hexagons, or non-planar shapes such as spheres or bicubic surface patches, or with curved edges, etc.

Primitives are usually simple geometric shapes to facilitate intersection testing to determine whether a ray intersects a primitive. However, primitives can be used to represent more complex shapes. For example, a texture, e.g. a 2D image or a 3D volume, can be applied to a primitive, wherein the texture may have an alpha value which determines the opacity at different positions on the primitive, e.g. a maximum sampled alpha value (e.g. a value of 255 for 8-bit alpha values) means that the primitive is fully opaque at a sample position and a minimum sampled alpha value (e.g. a value of 0) means that the primitive is fully transparent at the sample position. Values in between the minimum and maximum alpha values can represent partial opacity. For the purposes of intersection testing in a ray tracing system, if a ray intersects a primitive at a position where the primitive is fully transparent (i.e. at a position where the alpha value is zero) then the intersection is not accepted, i.e. the ray passes straight through the primitive. In this way, setting the alpha value to zero can be used to represent holes in the primitive, i.e. positions on the primitive that are 'absent' so far as the intersection testing process is concerned. For intermediate alpha values, the system may opt to perform a weighted sum of the objects behind the primitive and of the shaded surface itself or, perhaps, to use a threshold value, often referred to in the art as an alpha test. Textures which include absent regions may be referred to as "punch through textures", "alpha tested textures" or "masked textures", and primitives to which these textures are applied may be referred to as "punch through primitives", "alpha tested transparent primitives" or "masked primitives". Punch through primitives are useful for representing geometry which has a complicated perimeter or lots of holes in it, such as foliage and chain link fences, with a small number of primitives.

Note that a 'texture' may not necessarily be an actual image—it may be computed 'on the fly'. Such computation may be done by executing a 'shader' program. 'Checking a texture' may thus also be understood to include these computational approaches.

FIG. 1 shows an example of two triangular primitives $102_1$ and $102_2$ which share an edge to form a quad. A texture representing a leaf is applied to the two primitives. The texture has some regions (e.g. 104) which are fully transparent, such that they are absent for the purposes of intersection testing. The texture also has some regions (e.g. 106) which are not transparent (e.g. they are opaque), such that they are present for the purposes of intersection testing. Finally, there may be a small number of regions (e.g. along the boundary between regions 104 and 106) which are partially transparent which may be handled with, for example, the two approaches mentioned previously for 'intermediate alpha' values. Different ray tracing systems may react differently to finding an intersection of a ray with a partially transparent region, e.g. the intersection may be treated as a hit, a miss or as a partial hit. One or more additional rays may be spawned as a result of a partial hit.

When an intersection testing process finds that a ray intersects a punch through primitive then the intersection testing process for the ray may be stalled while a shader program is executed on a programmable execution unit to determine whether the primitive is present at the intersection point where the ray intersects the primitive. The presence of the primitive at the intersection point is often determined by the alpha channel of a texture that is mapped onto the primitive. Passing between the intersection testing process (which may be implemented in fixed function hardware) and a shader program (which is executed on a programmable execution unit) introduces latency into the ray tracing system. For example, fixed function hardware implementing the intersection testing process may stall for thousands of clock cycles while the shader program is executed on a programmable execution unit to determine the presence of the primitive at an intersection point. So reducing the number of times that a shader program needs to be executed to determine the presence of a punch through primitive at an intersection point would significantly improve the performance of the ray tracing system. It would be particularly beneficial to reduce the number of times that a shader program needs to be executed to determine the presence of a punch through primitive at an intersection point without increasing the number of primitives used to represent the geometry because increasing the number of primitives would increase the processing costs in the ray tracing system, e.g. the processing costs of rendering, simulation and updates to the acceleration structure.

A paper called "Sub-triangle opacity masks for faster ray tracing of transparent objects" by Holger Gruen, Carsten Benthin and Sven Woop (Proceedings of the ACM on Computer Graphics and Interactive Techniques, Volume 3, Issue 2, Article No.: 18) proposes using sub-triangle opacity masks for ray tracing of alpha tested transparent primitives. Each triangular primitive is subdivided into a set of uniformly sized sub-primitives. For example, FIG. 2 shows a triangular primitive 202 that is subdivided into 64 uniformly sized sub-primitives, labelled 0 to 63. Barycentric coordinates are labelled for the three vertices of the triangular primitive 202 as b=0, 0, 1, b=0, 1, 0 and b=1, 0, 0. Any position within the triangular primitive 202 can be uniquely identified with barycentric coordinates, to thereby indicate which of the sub-primitives (0 to 63) the position is within. For each sub-primitive (0 to 63) an evaluation is made in a pre-processing step to determine sub-primitive presence indications which indicate whether each of the sub-primitives is: (i) fully present, (ii) fully absent, or (iii) partially present. If a sub-primitive is partially present then the texture would need to be checked, e.g. by executing a shader program, to determine whether a particular point within the sub-primitive is present or absent. This pre-processing step may be performed by an Application Programming Interface (API) or as part of the process of creating the primitives and textures, e.g. by a user. Each of the sub-primitive presence indications is represented with 2 bits to indicate one of the three presence states: (i) fully present, (ii) fully absent, or (iii) partially present. A "partially present" state may be referred to as a "check texture" state because the presence at a position within a sub-primitive which is partially present is determined by checking the texture, i.e. by executing a shader program.

When an intersection is found between a ray and a primitive, the presence indications can be queried in order to determine whether to accept the intersection. The position of an intersection within a primitive, e.g. as indicated with barycentric coordinates, is used to identify the sub-primitive that the intersection point is within. If the presence indication for the identified sub-primitive indicates that the sub-primitive is fully present or fully absent then the intersection testing process can continue with the intersection testing without needing to execute a shader program to determine the presence of the primitive at the intersection point. However, if the presence indication for the identified sub-primitive indicates that the sub-primitive is partially present then the texture is checked, by executing a shader program, to determine the presence of the primitive at the intersection point.

The use of the presence indications reduces the number of times that a shader program needs to be executed to check a texture to determine the presence of a primitive at an intersection point to determine whether to accept an intersection. In other words, the presence indications are used to determine fully absent and fully present regions of primitives thereby reducing the number of times that alpha testing needs to be performed, thereby skipping the more expensive alpha-test operation where possible. Alpha testing (i.e. running a shader program to check the alpha value of the texture at the intersection point) is an expensive operation in terms of latency and power consumption.

If a primitive is sub-divided into K sub-primitives, 2K bits are used for the presence indications for the primitive, and these bits would be included with the rest of the primitive data for the primitive in the intersection testing process. In the example shown in FIG. 2, K is 64, such that 128 bits are used for the presence indications for the primitive 202. This is a significant increase in the amount of primitive data used to describe a primitive.

Furthermore, UK patents GB2538856B and GB2522868B describe a rasterization rendering technique in which an opacity state map is used to indicate whether blocks of texels of a texture are fully opaque, fully transparent, partially transparent or a mixture of these states. The indications in the opacity state map can be used to accelerate the processing of punch through primitives in a rasterization system. Similar to the presence indications described above with reference to a ray tracing system, each of the opacity states in the rasterization system of GB2538856B and GB2522868B is represented with two bits.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

There is provided a method of compressing, into a block of compressed data, a block of sub-primitive presence indications for use in a rendering system (e.g. for use in intersection testing in the rendering system), wherein the block of sub-primitive presence indications is subdivided into a plurality of parent regions, each of the parent regions being subdivided into a plurality of child regions, the method comprising:

identifying a presence state for each of the child regions based on the sub-primitive presence indications in the block of sub-primitive presence indications; and storing, in the block of compressed data, a hierarchical representation of the block of sub-primitive presence indications, wherein:

for each of one or more parent regions whose child regions all have the same identified presence state, parent-level data is included in the hierarchical representation to represent the presence state of the parent region without child-level data for the child regions within the parent region being included in the hierarchical representation, and for each of one or more parent regions whose child regions do not all have the same identified presence state, child-level data for the child regions within the parent region is included in the hierarchical representation to represent the presence states for the child regions within the parent region.

Each of the child regions may correspond with a respective one of the sub-primitive presence indications in the block of sub-primitive presence indications, wherein said identifying a presence state for each of the child regions may comprise reading the corresponding sub-primitive presence indication from the block of sub-primitive presence indications.

Each of the presence indications in the block of sub-primitive presence indications may indicate a presence state which is one of: (i) fully present, (ii) fully absent, and (iii) partially present.

Parent-level data representing a presence state of a parent region may indicate that:
(i) all of the child regions within the parent region are fully present,
(ii) all of the child regions within the parent region are fully absent,
(iii) all of the child regions within the parent region are partially present, or
(iv) the child regions within the parent region have a mix of presence states.

Child-level data representing a presence state of a child region may indicate that:
(i) the child region is fully present,
(ii) the child region is fully absent, or
(iii) the child region is partially present.

There may be a predetermined ordering of parent regions within the block of sub-primitive presence indications and there may be a predetermined ordering of child regions within each of the parent regions.

The method may further comprise, if an initial hierarchical representation of the block of sub-primitive presence indications has more than a threshold number of bits, changing one or more of the sub-primitive presence states to be partially present, and determining another hierarchical representation of the block of sub-primitive presence indications that does not have more than the threshold number of bits.

The child regions and the parent regions may be triangular, or the child regions and the parent regions may be rectangular.

Each of the parent regions may have four child regions within it.

The method may further comprise, for each of the one or more parent regions whose child regions do not all have the same identified presence state, ensuring that three of the child regions within the parent region have the same presence state as each other.

Said ensuring that three of the child regions within the parent region have the same presence state as each other may comprise setting a presence state to be partially present for one or more child regions which initially had a presence state of fully present or fully absent.

For each of the one or more parent regions whose child regions do not all have the same identified presence state, the child-level data for the four child regions within the parent region may comprise:
(a) a palette indication to indicate that one of:
  (i) a majority of the four child regions have a partially present presence state and a minority of the four child regions have a fully present presence state,
  (ii) a majority of the four child regions have a partially present presence state and a minority of the four child regions have a fully absent presence state,
  (iii) a majority of the four child regions have a fully present presence state and a minority of the four child regions have a partially present presence state, and
  (iv) a majority of the four child regions have a fully absent presence state and a minority of the four child regions have a partially present presence state; and
(b) a minority position indication to indicate the position of said minority of the four child regions within the parent region.

The block of sub-primitive presence indications may be subdivided into a plurality of grandparent regions, wherein each of the grandparent regions may be subdivided into a respective plurality of the parent regions.

For each of one or more grandparent regions whose parent regions all have child regions within them which all have the same identified presence state, grandparent-level data may be included in the hierarchical representation to represent the presence state of the grandparent region without parent-level data or child-level data for the parent regions or child regions within the grandparent region being included in the hierarchical representation.

Grandparent-level data representing a presence state of a grandparent region may indicate that:
(i) all of the child regions within all of the parent regions within the grandparent region are fully present,
(ii) all of the child regions within all of the parent regions within the grandparent region are fully absent,
(iii) all of the child regions within all of the parent regions within the grandparent region are partially present,
(iv) all of the child regions within the parent regions within the grandparent region are either fully present or partially present,
(v) all of the child regions within the parent regions within the grandparent region are either fully absent or partially present, or
(vi) the child regions within the parent regions within the grandparent region have a mix of fully present, fully absent and partially present presence states.

For a parent region within a grandparent region whose grandparent-level data indicates that (iv) all of the child regions within the parent regions within the grandparent region are either fully present or partially present, parent-level data representing a presence state of the parent region may indicate that:
(i) all of the child regions within the parent region are fully present,
(ii) all of the child regions within the parent region are partially present, or
(iii) the child regions within the parent region have a mix of fully present and partially present presence states.

For a parent region within a grandparent region whose grandparent-level data indicates that (v) all of the child regions within the parent regions within the grandparent region are either fully absent or partially present, parent-level data representing a presence state of the parent region may indicate that:
(i) all of the child regions within the parent region are fully absent,
(ii) all of the child regions within the parent region are partially present, or
(iii) the child regions within the parent region have a mix of fully absent and partially present presence states.

For a parent region within a grandparent region whose grandparent-level data indicates that (vi) the child regions within the parent regions within the grandparent region have a mix of fully present, fully absent and partially present presence states, parent-level data representing a presence state of the parent region may indicate that:
(i) all of the child regions within the parent region are fully present,
(ii) all of the child regions within the parent region are fully absent,
(iii) all of the child regions within the parent region are partially present,
(iv) the child regions within the parent region have a mix of fully present and partially present presence states, or
(v) the child regions within the parent region have a mix of fully absent and partially present presence states.

For a child region within a parent region whose parent-level data indicates that the child regions within the parent region have a mix of fully present and partially present presence states, child-level data representing a presence state of the child region may indicate whether the child region has a fully present or partially present presence state. For a child region within a parent region whose parent-level data indicates that the child regions within the parent region have a mix of fully absent and partially present presence states, child-level data representing a presence state of the child region may indicate whether the child region has a fully absent or partially present presence state.

The method may further comprise storing the block of compressed data.

The rendering system may be a ray tracing system or a rasterization system.

There is provided a compression unit configured to compress, into a block of compressed data, a block of sub-primitive presence indications for use in a rendering system (e.g. for use in intersection testing in the rendering system), wherein the block of sub-primitive presence indications is subdivided into a plurality of parent regions, each of the parent regions being subdivided into a plurality of child regions, the compression unit being configured to:
identify a presence state for each of the child regions based on the sub-primitive presence indications in the block of sub-primitive presence indications; and
store, in the block of compressed data, a hierarchical representation of the block of sub-primitive presence indications, wherein:
for each of one or more parent regions whose child regions all have the same identified presence state, parent-level data is included in the hierarchical representation to represent the presence state of the parent region without child-level data for the child regions within the parent region being included in the hierarchical representation, and
for each of one or more parent regions whose child regions do not all have the same identified presence state, child-level data for the child regions within the parent region is included in the hierarchical representation to represent the presence states for the child regions within the parent region.

There may be provided a compression unit configured to perform any of the compression methods described herein.

There may be provided a method of decompressing compressed data to determine one or more sub-primitive presence indications for use in a rendering system (e.g. for use in intersection testing in the rendering system), the method comprising:
receiving a block of compressed data for a block of sub-primitive presence indications, wherein the block of sub-primitive presence indications is subdivided into a plurality of parent regions, each of the parent regions being subdivided into a plurality of child regions, wherein the block of compressed data comprises a hierarchical representation of the block of sub-primitive presence indications, wherein: (i) for each of one or more parent regions whose child regions all have the same presence state, parent-level data is included in the hierarchical representation to represent the presence state of the parent region without child-level data for the child regions within the parent region being included in the hierarchical representation, and (ii) for each of one or more parent regions whose child regions do not all have the same presence state, child-level data for the child regions within the parent region is included in the hierarchical representation to represent the presence states for the child regions within the parent region;
determining whether child-level data is included in the hierarchical representation for one of the parent regions;
if it is determined that child-level data is included in the hierarchical representation for said one of the parent regions, using child-level data for said one of the parent regions to determine one or more sub-primitive presence indications in said one of the parent regions; and
if it is determined that child-level data is not included in the hierarchical representation for said one of the parent regions, using parent-level data for said one of the parent regions, without child-level data, to determine one or more sub-primitive presence indications in said one of the parent regions.

There may be provided a decompression unit configured to decompress compressed data to determine sub-primitive presence indications for use in a rendering system (e.g. for use in intersection testing in the rendering system), the decompression unit being configured to:
receive a block of compressed data for a block of sub-primitive presence indications, wherein the block of sub-primitive presence indications is subdivided into a plurality of parent regions, each of the parent regions being subdivided into a plurality of child regions, wherein the block of compressed data comprises a hierarchical representation of the block of sub-primitive presence indications, wherein: (i) for each of one or more parent regions whose child regions all have the same presence state, parent-level data is included in the hierarchical representation to represent the presence state of the parent region without child-level data for the child regions within the parent region being included in the hierarchical representation, and (ii) for each of one or more parent regions whose child regions do not all have the same presence state, child-level data for the child regions within the parent region is included in the hierarchical representation to represent the presence states for the child regions within the parent region;

determine whether child-level data is included in the hierarchical representation for one of the parent regions;

if it is determined that child-level data is included in the hierarchical representation for said one of the parent regions, use the child-level data for said one of the parent regions to determine one or more sub-primitive presence indications in said one of the parent regions; and if it is determined that child-level data is not included in the hierarchical representation for said one of the parent regions, use parent-level data for said one of the parent regions, without child-level data, to determine one or more sub-primitive presence indications in said one of the parent regions.

The compression unit or decompression unit may be embodied in hardware on an integrated circuit. There may be provided a method of manufacturing, at an integrated circuit manufacturing system, a compression unit or a decompression unit. There may be provided an integrated circuit definition dataset that, when processed in an integrated circuit manufacturing system, configures the system to manufacture a compression unit or a decompression unit. There may be provided a non-transitory computer readable storage medium having stored thereon a computer readable description of a compression unit or a decompression unit that, when processed in an integrated circuit manufacturing system, causes the integrated circuit manufacturing system to manufacture an integrated circuit embodying a compression unit or a decompression unit.

There may be provided an integrated circuit manufacturing system comprising: a non-transitory computer readable storage medium having stored thereon a computer readable description of the compression unit or decompression unit; a layout processing system configured to process the computer readable description so as to generate a circuit layout description of an integrated circuit embodying the compression unit or decompression unit; and an integrated circuit generation system configured to manufacture the compression unit or decompression unit according to the circuit layout description.

There may be provided computer program code for performing any of the methods described herein. There may be provided a non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
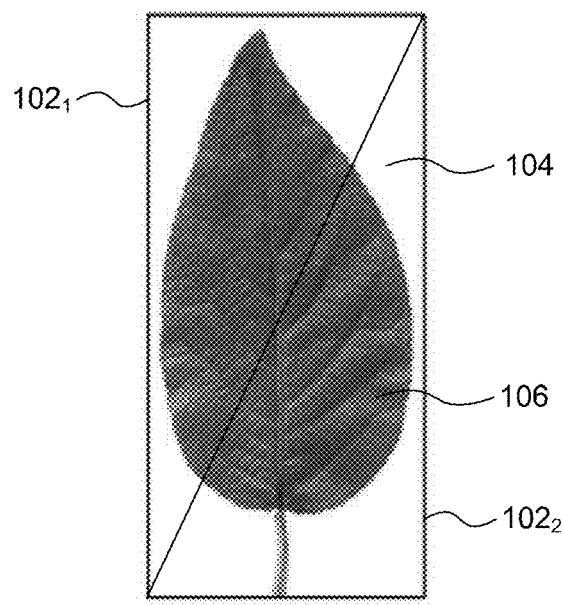
FIG. 1 shows a punch through texture applied to two primitives which form a quad.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only. In the present disclosure, a sub-primitive presence indication is representative of a presence state of a corresponding sub-primitive.

In the ray tracing system described in the background section above, each of the presence indications is stored with 2 bits, such that if a primitive is sub-divided into K sub-primitives, 2K bits are used for the presence indications for the primitive. Reducing the amount of data used to represent the presence indications would be beneficial in terms of reducing the amount of memory needed to store the presence indications and reducing the amount of data transferred between different components in the ray tracing system. Therefore, the reduction in the amount of data used to represent the presence indications may reduce the latency, power consumption and silicon area of the ray tracing system.

As a simple example of how to compress the presence indications, it is noted that two bits are used for each presence indication to indicate one of three presence states (fully present, fully absent or partially present), so if we combine the presence information for multiple sub-primitives then the presence indications for a group of sub-primitives may be able to be represented with fewer than an average of 2 bits per sub-primitive. As an example, the presence indications for a group of 5 sub-primitives (i.e. $3^5=243$ possible combinations of presence states) could be stored in 8 bits (i.e. $2^8=256$ possible encodings). In this simple example, if a primitive is sub-divided into K sub-primitives, approximately 1.6K bits are used for the presence indications for the primitive. The compression of 2K bits to 1.6K bits represents a compression ratio of 80%, where the compression ratio is defined as the size of the compressed data divided by the size of the uncompressed data. Compressing data to a greater extent results in a smaller compression ratio.

In the examples described below, compression and decompression techniques are described which can compress the presence indications to a greater extent (i.e. achieve lower compression ratios) than in the simple example described above.

Note that having three states, as opposed to a simpler scheme with only "fully present" and "fully absent" states, is attractive from a quality point of view as a two state system is likely to lead to visible aliasing (i.e. jagged edges) unless, perhaps, an extremely high resolution, and thus memory intensive, mask is used. Further, though a two-state scheme may benefit from never having to run a shader to "check texture", it also means that some use cases which do need partial transparency, e.g. modelling a stained-glass window, would be suboptimal. Having said this, the examples described below in which a hierarchical encoding approach is used can be adapted by one skilled in the art, to a system with just two states.

Figure 3:
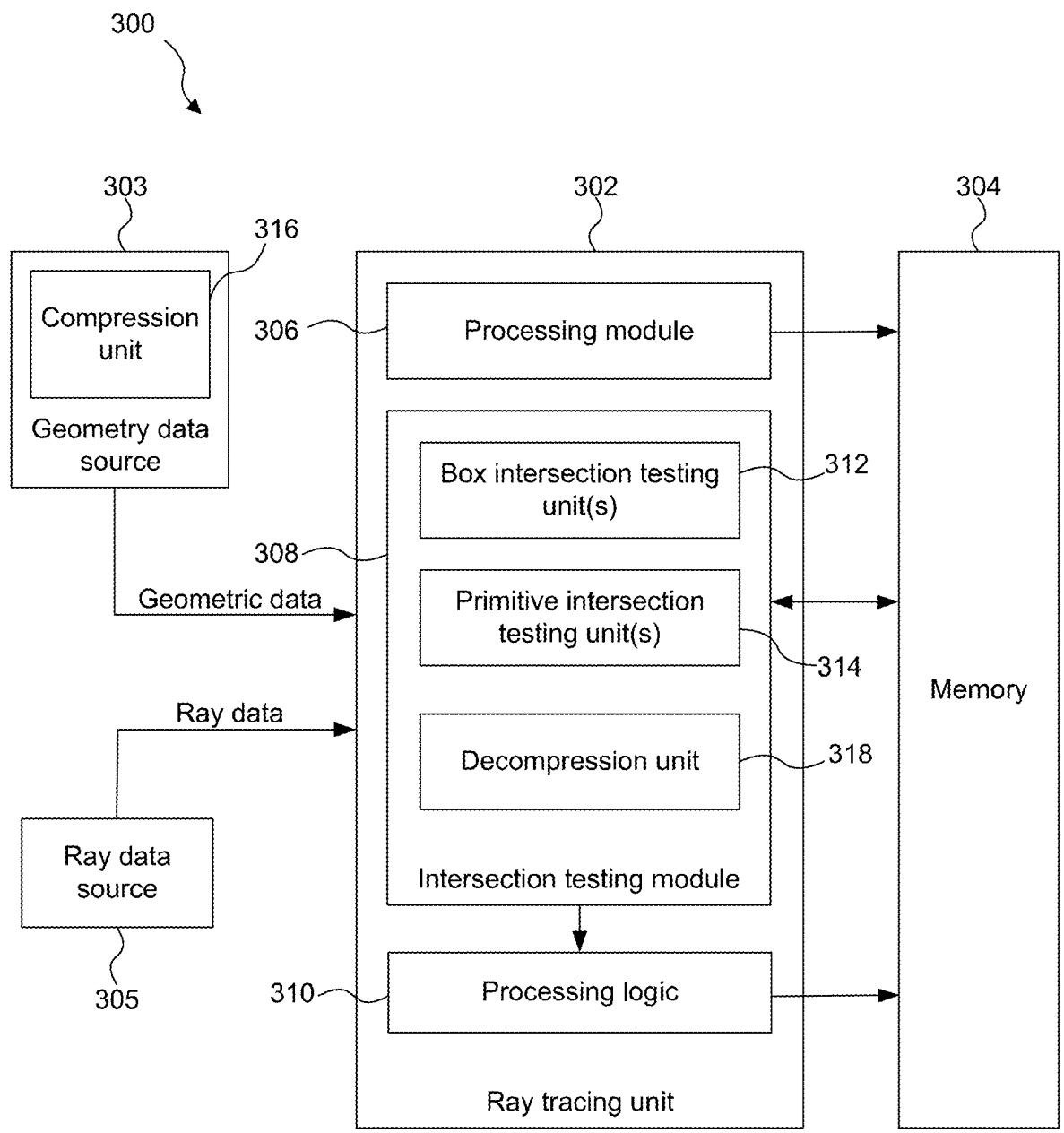
FIG. 3 shows a ray tracing system according to examples described herein.

FIG. 3 shows a ray tracing system 300 comprising a ray tracing unit 302 and a memory 304. The ray tracing system 300 also comprises a geometry data source 303 and a ray data source 305. The ray tracing unit 302 comprises a processing module 306, an intersection testing module 308 and processing logic 310. The intersection testing module 308 comprises one or more box intersection testing units 312, one or more primitive intersection testing units 314 and a decompression unit 318. The geometry data source comprises a compression unit 316. In operation the ray tracing unit 302 receives geometric data defining objects within the 3D scene from the geometry data source 303. The ray tracing unit 302 also receives ray data defining rays that are to be tested for intersection from the ray data source 305. The rays may be primary rays or secondary rays. The processing module 306 is configured to generate an acceleration structure based on the geometric data, and to send the acceleration structure to the memory 304 for storage therein. After the acceleration structure has been stored in the memory 304, the intersection testing module 308 can retrieve nodes (e.g. comprising data defining axis-aligned boxes corresponding to the nodes) of the acceleration structure from the memory 304 to perform intersection testing of rays against the retrieved nodes. The box intersection testing unit(s) 312 perform box intersection tests to determine whether or not a ray intersects each of the bounding boxes corresponding to nodes of the acceleration structure (where a miss can cull vast swathes of the hierarchical acceleration structure). If it is determined that a leaf node is intersected then the primitive intersection testing unit(s) 314 perform one or more primitive intersection tests to determine which object(s) (if any) the ray intersects. In this example, the primitives are triangles, or pairs of triangles, although it is noted that in other examples, the primitives could be other shapes, e.g. other convex planar polygons, such as rectangles (which includes squares), pentagons, hexagons, etc. The results of the intersection tests indicate which primitive in the scene a ray intersects, and the results may also indicate other intersection data, such as a position on the object at which the ray intersects the object (e.g. defined in terms of barycentric coordinates), and may also indicate a distance, e.g., Euclidean or as a (signed) multiple of ray lengths, along the ray that the intersection occurs. In some instances, the intersection determination may be based on whether the distance along the ray that the intersection occurs is between minimal and maximal clipping distances for the ray (which may be referred to as $t_{min}$ and $t_{max}$). The results of the intersection testing are provided to the processing logic 310. The processing logic 310 is configured to process the results of the intersection testing to determine rendered values representing the image of the 3D scene. The rendered values determined by the processing logic 310 can be passed back to the memory 304 for storage therein to represent the image of the 3D scene.

In the examples described herein the ray tracing system uses an acceleration structure in order to reduce the number of intersection tests that need to be performed for a ray against primitives. However, it is noted that some other examples might not use an acceleration structure, and may simply test rays against the primitives without first attempting to reduce the number of intersection tests that need to be performed using an acceleration structure.

When the primitive intersection testing unit(s) 314 of the intersection testing module 308 determine that a ray intersects a primitive which has partial presence then typically the intersection testing module 308 would need to stall while a shader program was executed on the processing logic 310 to resolve the presence of the primitive at the intersection point. Some of these stalls can be avoided by the use of the sub-primitive presence indications as described herein.

Compression and decompression of the sub-primitive presence indications is performed, in examples described below, using a hierarchical encoding approach, which is a lossless or a lossy compression approach, depending on the implementation. In this approach, a block of sub-primitive presence indications is compressed into a block of compressed data for use in intersection testing in a ray tracing system. The inventors have realised that because the primitives represent physical structures, the distribution of presence indications is rarely random. Sub-primitives with a particular presence state are often next to sub-primitives with the same presence state. This order (i.e. non-randomness) to the distribution of presence states can be leveraged to achieve better compression of the block of presence indications.

It is noted that in the example shown in FIG. 3 the compression unit 316 is implemented in the geometry data source 303, but in other examples, the compression unit 316 could be implemented in a different component to the geometry data source 303, and in some examples may be implemented in the ray tracing unit 302, e.g. as part of the intersection testing module 308. Furthermore, in the example shown in FIG. 3, the decompression unit 318 is implemented as part of the intersection testing module 308, but in other examples it could be implemented somewhere other than as part of the intersection testing module 308.

Figure 4:
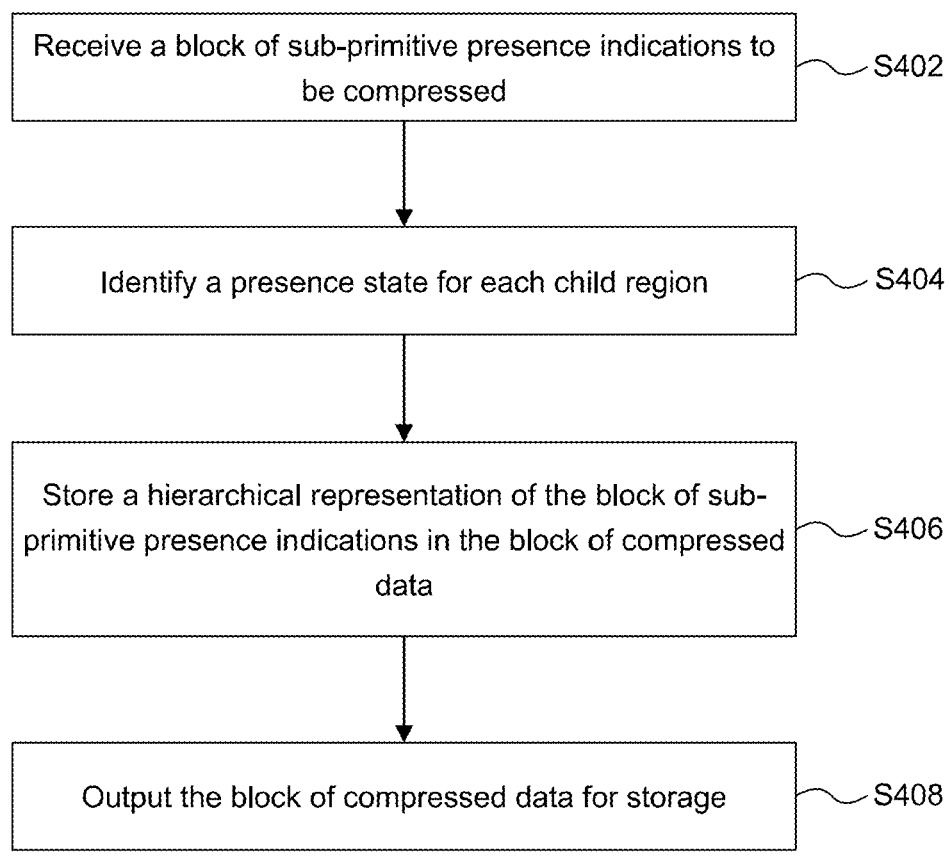
FIG. 4 is a flow chart for a method of compressing a block of sub-primitive presence indications into a block of compressed data.

A method of compressing a block of sub-primitive presence indications into a block of compressed data is described with reference to the flow chart of FIG. 4. This compression is performed by the compression unit 316.

Figure 5C:
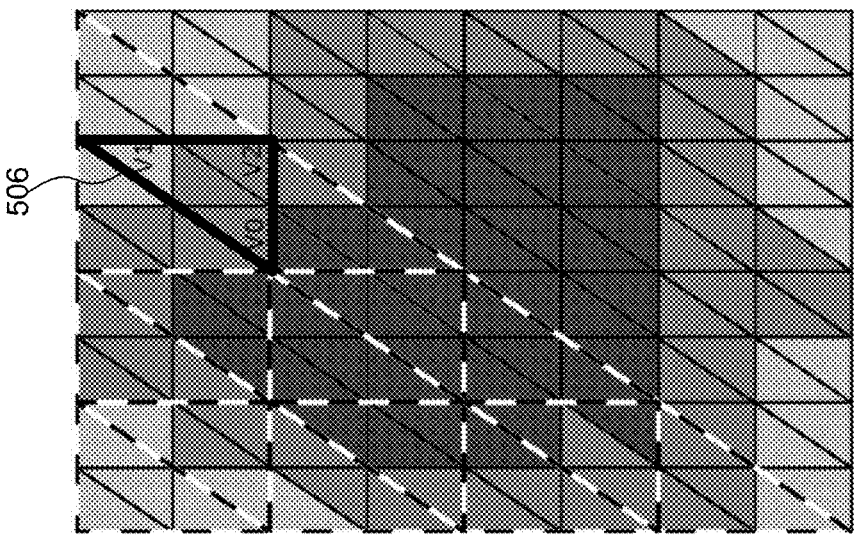
FIG. 5c shows the block of presence indications shown in FIG. 5a, highlighting some parent regions in the block of presence indications.

In step S402 the compression unit 316 receives a block of sub-primitive presence indications to be compressed. For example, FIG. 1 shows an object which has partial presence. In this example the object is a leaf and is represented with a pair of triangular primitives $102_1$ and $102_2$ that form a quad because they share an edge. FIG. 5a shows a block of presence indications 502 for the object which is received at the compression unit 316. The object is divided into 128 triangular sub-primitives. In particular, each of the primitives $102_1$ and $102_2$ is subdivided into 64 uniformly-sized triangular sub-primitives. In other examples, the block of presence indications may have a different number of sub-primitives and they may be arranged into other shapes, e.g. rectangles or triangles (wherein the term "rectangles" is used herein to include squares). In FIG. 5a each presence indication is represented with one of three hatchings to represent one of the three possible presence states. In particular, presence indications that indicate that a respective sub-primitive is fully present are represented with dark hatching; presence indications that indicate that a respective sub-primitive is fully absent are represented with light hatching; and presence indications that indicate that a respective sub-primitive is partially present are represented with mid-level hatching. As mentioned above, the presence indications that are received in step S402 may be determined in a pre-processing step, which may be performed by an Application Programming Interface (API) or as part of a process of creating the primitives and textures, e.g. by a user. Each of the (uncompressed) sub-primitive presence indications is represented with 2 bits to indicate one of the three presence states: (i) fully present, (ii) fully absent, or (iii) partially present. The presence indications are ternary data, i.e. they can have one of three possible values.

Figure 5B:
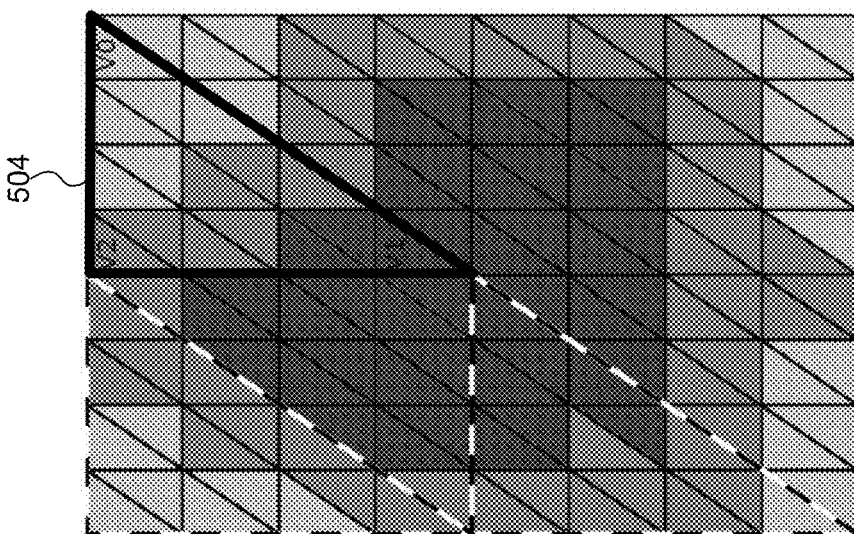
FIG. 5b shows the block of presence indications shown in FIG. 5a, highlighting some grandparent regions in the block of presence indications.
Figure 5A:
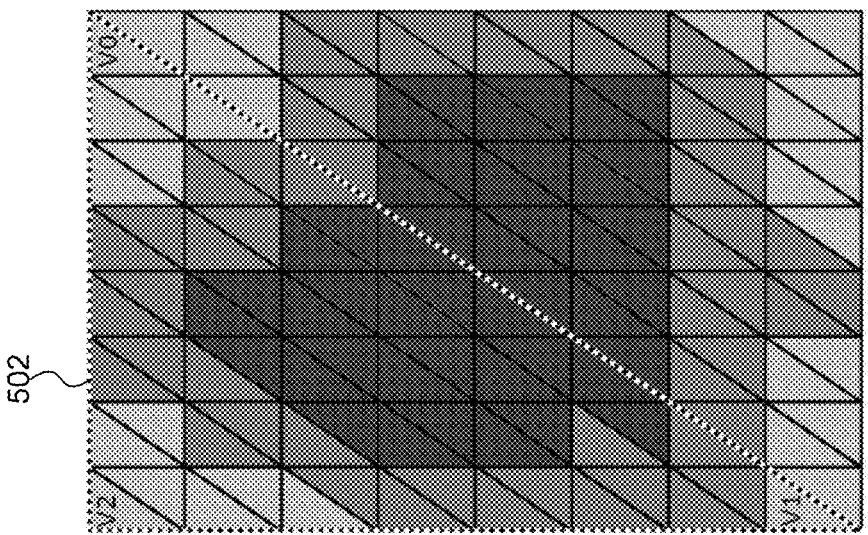
FIG. 5a shows a block of presence indications for the object shown in FIG. 1.

FIG. 5b shows the block of presence indications shown in FIG. 5a, highlighting some grandparent regions in the block of presence indications. In particular, the sub-primitive presence indications for the top left primitive have been grouped into grandparent regions, wherein each grandparent region comprises 16 sub-primitive presence indications. The grandparent regions may be referred to as level-0 or "L0" regions. One of the grandparent regions is denoted with reference numeral 504 in FIG. 5b. In this example, the grandparent regions have the same shape (triangular in this example), but a different size, compared to the primitives and the sub-primitives.

FIG. 5c shows the block of presence indications shown in FIGS. 5a and 5b, highlighting some parent regions in the block of presence indications. In particular, the sub-primitive presence indications for the top left primitive have been grouped into parent regions, wherein each parent region comprises 4 sub-primitive presence indications. Therefore each grandparent region comprises 4 parent regions. The parent regions may be referred to as level-1 or "L1" regions. One of the parent regions is denoted with reference numeral 506 in FIG. 5c. It is noted that the parent regions have the same shape (triangular in this example), but a different size, compared to the primitives, the grandparent regions and the sub-primitives.

Each of the parent regions is subdivided into a plurality of child regions, wherein each of the child regions corresponds with a respective one of the sub-primitive presence indications in the block of sub-primitive presence indications 502. In this example, each parent region comprises 4 child regions.

In step S404 the compression unit 316 identifies a presence state for each of the child regions based on the sub-primitive presence indications in the block of sub-primitive presence indications. In the example shown in FIGS. 5a to 5c, the child regions correspond with the respective sub-primitive presence indications in the block of sub-primitive presence indications 502, and step S404 comprises identifying a presence state for each of the child regions by reading the corresponding sub-primitive presence indication from the block of sub-primitive presence indications.

In step S406 the compression unit 316 stores, in the block of compressed data, a hierarchical representation of the block of sub-primitive presence indications. For each of one or more parent regions whose child regions all have the same identified presence state, parent-level data is included in the hierarchical representation to represent the presence state of the parent region without child-level data for the child regions within the parent region being included in the hierarchical representation. For each of one or more parent regions whose child regions do not all have the same identified presence state, child-level data for the child regions within the parent region is included in the hierarchical representation to represent the individual presence states for the child regions within the parent region. In this way, if all of the child regions within a parent region have the same presence state then child-level data for each of the child regions within that parent region is not stored, and instead parent-level data for the parent region is sufficient to represent the presence states of all of the child regions within the parent region. Since child-level data is not needed to be stored for the child regions in this case, the hierarchical encoding approach described herein reduces the amount of data that is needed to be stored to represent the sub-primitive presence indications. This can (sometimes) be achieved without losing any information (i.e. it can be lossless compression) because for a parent region in which it is not the case that all of the child regions have the same presence state, parent-level data can indicate that there is a mix of presence states in the parent region and child-level data is stored to indicate the presence states for each of the child regions within the parent region. In this way, the level of subdivision of the primitive at which data is stored can be different for different regions of the primitive. As described in more detail below, the child-level data may or may not losslessly indicate the presence states for each of the child regions within a parent region.

In general, increasing the number of sub-divisions (i.e. reducing the size of the sub-primitives) tends to provide better results in terms of increasing the proportion of sub-primitives that are either fully present or fully absent, but tends to require more data for the sub-primitive presence indications. The optimal level of sub-division may be different for different regions of a primitive, e.g. a region with a mostly flat texture may benefit from a coarser resolution sub-division, whereas a region with a detailed texture may benefit from a finer resolution sub-division. Using a hierarchical encoding approach, as described herein, allows the resolution at which presence data is stored for the sub-primitives to be different for different regions of a primitive, e.g. by: (i) providing a finer resolution where this is useful for increasing the proportion of sub-primitives that are either fully present or fully absent, and (ii) providing a coarser resolution for reducing the amount of data used to represent the presence indications in regions where a finer resolution is not useful. Generally, the less detail there is in the alpha channel of the texture, the more the data can be compressed because a greater proportion of the parent regions have child regions which all have the same presence state, such that less child-level data is stored.

In step S408 the compression unit 316 outputs the block of compressed data for storage. The block of compressed data may be stored with the primitive data for the primitive, e.g. in the geometry data source 303. The block of compressed data may be passed with the primitive data for the primitive to the ray tracing unit 302 and may be stored in the memory 304 and/or in memory within the intersection testing module 308 for use by the primitive intersection testing unit(s) 314 as part of performing intersection testing for a ray with respect to the primitive.

For example, parent-level data representing a presence state of a parent region (e.g. parent region 506) might indicate one of four things: (i) that all of the child regions within the parent region are fully present, (ii) that all of the child regions within the parent region are fully absent, (iii) that all of the child regions within the parent region are partially present, or (iv) that the child regions within the parent region have a mix of presence states. In this example, 2 bits of parent-level data is sufficient for each parent region because one of four things is indicated with the parent-level data for each parent region. Child-level data representing a presence state of a child region (e.g. one of the triangular sub-primitives shown in FIGS. 5a to 5c) might indicate one of three things: (i) that the child region is fully present, (ii) that the child region is fully absent, or (iii) that the child region is partially present. As a simple example, 2 bits of child-level data could be stored for a child region because one of three things is indicated with the child-level data for each parent region. In examples described below, the parent-level data and the child-level data are stored in different formats which can provide for more compression (i.e. lower compression ratios) than the examples described in this paragraph.

Figure 2:
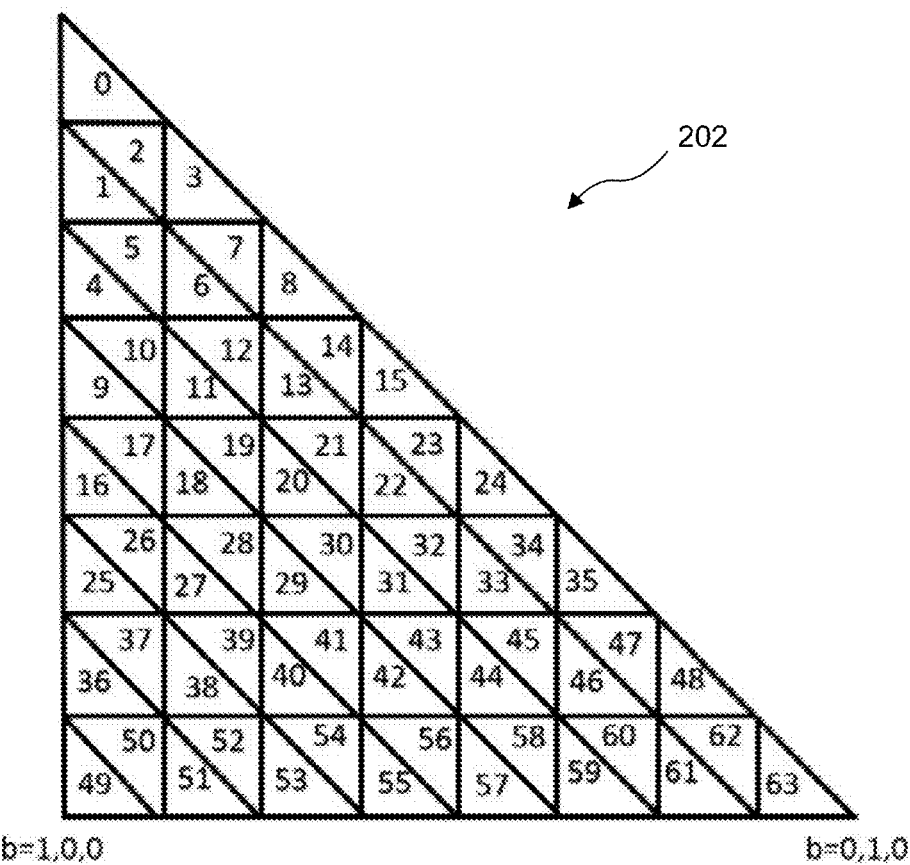
FIG. 2 shows a triangular primitive which is sub-divided into 64 sub-primitives.

In examples described herein, there is a predetermined ordering of parent regions within the block of sub-primitive presence indications and there is a predetermined ordering of child regions within each of the parent regions. The predetermined ordering allows for a hierarchical indexing of the parent regions and the child regions (and of the grandparent regions if they are used too). Instead of labelling all of the sub-primitives in sequence as shown in FIG. 2, the sub-primitives are subdivided recursively. This allows us to keep a hierarchical coherence. However it introduces a different order of indexing.

For example, FIGS. 5a to 5c indicate the ordering of the vertices of a primitive in block 502, of a grandparent region 504 and of a parent region 506. In particular, the top left triangular primitive in FIG. 5a has ordered vertices V0, V1 and V2, with V0 being in the top right of the primitive, V1 being in the bottom left of the primitive and V2 being in the top left of the primitive. This primitive is subdivided into four grandparent regions as shown in FIG. 5b which are "similar" triangles. Therefore, the grandparent regions all have the same angles as the primitive and proportional edges. In other words, the grandparent regions are copies of the primitive that are scaled and sometimes rotated. This can be done by identifying the midpoints on each edge and connecting these midpoints, creating parallel lines to the actual edges of the primitive.

Three of the four grandparent regions contain one of the original primitives' vertices, and the order of the remaining vertices in the grandparent region are determined by the primitive's vertex order (clockwise or anticlockwise). For example, the grandparent region 504 has vertex V0 of the primitive shown in FIG. 5a, and then the other two vertices of the grandparent region 504 follow the same order as in the primitive, such that V1 is in the bottom left and V2 is in the top left. The grandparent regions are ordered in the same order as the vertices of the original primitive (e.g. the grandparent region 504 containing vertex V0 of the primitive is put first, then the grandparent region containing vertex V1 of the primitive is next, then the grandparent region containing vertex V2 of the primitive is next, and then the grandparent region containing none of the vertices of the primitive is last). The vertex order within the grandparent regions is arranged by matching the angles to the parent primitive. For example, if a grandparent region contains the vertex V1 from the primitive, the vertex order in that grandparent region would consider that vertex to be "Vertex 1" of the grandparent region as well. For the final grandparent region (that does not contain any of the vertices of the primitive) the principle of angles still hold, so for the middle grandparent region shown in FIG. 5b the bottom left vertex is V0, the top right vertex is V1 and the bottom right vertex if V2.

Each of the grandparent regions shown in FIG. 5b are subdivided into four parent regions as shown in FIG. 5c which are "similar" triangles. The subdivision of a grandparent region into four parent regions follows the same process as the subdivision of the primitive into four grandparent regions. Therefore, the parent regions all have the same angles as the grandparent regions and proportional edges. In other words, the parent regions within a grandparent region are copies of the grandparent region that are scaled and sometimes rotated. This can be done by identifying the midpoints on each edge and connecting these midpoints, creating parallel lines to the actual edges of the grandparent region. Three of the four parent regions within a grandparent region contain one of the vertices of the grandparent region, and the order of the remaining vertices in the parent region are determined by the grandparent's vertex order (clockwise or anticlockwise). For the final parent region (that does not contain any of the vertices of the grandparent region) the principle of angles still hold, so for the parent region 506 shown in FIG. 5c the bottom left vertex is V0, the top right vertex is V1 and the bottom right vertex if V2. The parent regions within a grandparent region are ordered in the same order as the vertices of the grandparent region (e.g. the parent region containing vertex V0 of the grandparent region is put first, then the parent region containing vertex V1 of the grandparent region is next, then the parent region containing vertex V2 of the grandparent region is next, and then the parent region containing none of the vertices of the grandparent region is last). The vertex order within the parent regions within a grandparent region is arranged by matching the angles to the grandparent region. For example, if a parent region contains the vertex V1 from the grandparent region, the vertex order in that parent region would consider that vertex to be "Vertex 1" of the parent region as well.

Each of the parent regions shown in FIG. 5c is subdivided into four child regions. The child regions correspond to respective sub-primitives. The subdivision of a parent region into four child regions follows the same process as the subdivision of the primitive into four grandparent regions (which is the same process as the subdivision of a grandparent region into four parent regions). The child regions within a parent region are ordered in the same order as the vertices of the parent region (e.g. the child region containing vertex V0 of the parent region is put first, then the child region containing vertex V1 of the parent region is next, then the child region containing vertex V2 of the parent region is next, and then the child region containing none of the vertices of the parent region is last).

As an example, the hierarchical representation of the sub-primitive presence indications that is stored in step S406 comprises data at two levels: an upper level and a lower level. For example, for each of the parent regions, one bit is stored in the upper level of the hierarchical representation to indicate whether child-level data is needed, i.e. whether all of the child regions within the parent region have the same presence state. For example, a 0 for a parent region can indicate that all of the child regions within a parent region have the same presence state, and a 1 for a parent region can indicate that it is not the case that all of the child regions within a parent region have the same presence state. In other implementations, the meaning of '0' and '1' can be reversed.

So for the sixteen parent regions shown in FIG. 5c, sixteen bits are stored in the upper level to indicate, for each parent region, whether or not all of the child regions within the parent region have the same presence state. In this example, the bits are ordered according to the ordering of the parent regions described above (i.e. the four parent regions within the top right grandparent region first, then the four parent regions within the bottom left grandparent region, then the four parent regions within the top left grandparent region, and then the four parent regions within the middle grandparent region, wherein within each grandparent region the four parent regions are ordered top right, bottom left, top left, middle). In the example shown in FIG. 5c the upper level bits of the hierarchical representation are 0111011101011100. The parent region 506 is the fourth parent region within the first grandparent region, so it is represented by the fourth bit in the upper level bits, which is a 1 because the parent region 506 includes child regions with a mix of presence states (in particular the parent region 506 includes three partially present regions and one fully absent child region).

The lower level encoding uses 2 bits for a parent region that is not subdivided and 4 bits for the child regions of a parent region that is subdivided. In particular, for a parent region that is not subdivided, the lower level encoding can use 2 bits to denote the presence state of all of the child regions within the parent regions, e.g. where '00' may denote a fully present presence state, '01' may denote a fully absent presence state, and '10' may denote a partially present presence state. As another example, since there are only three possible presence states, one of the presence states may be represented with one bit, whilst the other two presence states may be represented with two bits, e.g. a partially present presence state may be denoted with one bit: '1'. This would reduce the amount of data in the block of compressed data, but it would make the decoding of the data more difficult because the number of bits in the lower level encoding for a parent region could not be determined just based on the upper level bits, so identifying the positions of the bits in the lower level encoding would be more difficult. In particular, it would be more difficult to decode the data in parallel for different regions within the block of sub-primitive presence indications.

Gradients in alpha values of textures are finite, so it is impossible to have fully present sub-primitives and fully absent sub-primitives meeting each other. In the example shown in FIGS. 5a to 5c, each child region with a parent region meets all of the other child regions within that parent region, so it is not possible for a parent region to include a child region that is fully present and a child region that is fully absent. For each of the one or more parent regions whose child regions do not all have the same identified presence state, the compression unit 316 ensures that three of the child regions within the parent region have the same presence state as each other. This is often the case anyway, but it is possible for a parent region to include two child regions with a partially present presence state and two child regions with a different presence state, where the different presence state is either the fully absent presence state or the fully present presence state.

If a parent region includes two child regions with a partially present presence state and two child regions with a different presence state then the compression unit 316 can ensure that three of the child regions within the parent region have the same presence state as each other by setting a presence state to be partially present for a child region which initially had a different presence state (i.e. which initially had a fully present or a fully absent presence state). Changing the presence state of a child region in this way means that the compression process for compressing the sub-primitive presence indications is a lossy compression process. It is acceptable for a presence state of fully present or fully absent to be represented as partially present because this will not result in a rendering error in the intersection testing process. Instead it means that the intersection testing process will check the texture to determine the presence of the primitive at an intersection point with a sub-primitive. So an opportunity to reduce the latency of the intersection testing process by using the sub-primitive indications has been lost due to the lossy nature of the compression applied to the presence indications, but no rendering errors will occur, so this is acceptable. It would not be acceptable for a presence state of fully present or partially present to be represented as fully absent, or for a presence state of fully absent or partially present to be represented as fully present because this may result in a rendering error in the intersection testing process.

By ensuring, for each of the one or more parent regions whose child regions do not all have the same identified presence state, that three of the child regions within the parent region have the same presence state as each other, 4 bits can be used to represent the presence states of the child regions within the parent region. For example, the child-level data for the four child regions within the parent region may comprise:
  (a) a palette indication to indicate that one of:
    (i) a majority of the child regions (i.e. three of the four child regions) have a partially present presence state and a minority of the child regions (i.e. one of the four child regions) have a fully present presence state, which can be indicated with bits '00';
    (ii) a majority of the child regions (i.e. three of the four child regions) have a partially present presence state and a minority of the child regions (i.e. one of the four child regions) have a fully absent presence state, which can be indicated with bits '01';

(iii) a majority of the child regions (i.e. three of the four child regions) have a fully present presence state and a minority of the child regions (i.e. one of the four child regions) have a partially present presence state, which can be indicated with bits '10'; and (iv) a majority of the child regions (i.e. three of the four child regions) have a fully absent presence state and a minority of the child regions (i.e. three of the four child regions) have a partially present presence state, which can be indicated with bits '11'; and (b) a minority position indication to indicate the position of the minority one of the child regions within the parent region.

The palette indication can have 2 bits to indicate one of the four options mentioned above. The minority position indication can have 2 bits to indicate one of four positions of the minority child region within the parent region. So the child-level data for the four child regions within the parent region can have 4 bits.

For example, the parent region 506 shown in FIG. 5c includes three partially present child regions and one fully absent child region. Therefore, a majority of the child regions are partially present, and a minority of the child regions are fully absent, so palette indication bits of '01' can be used in the example outlined above. According to the ordering of the child regions within the parent region 506, the minority child region (i.e. the child region with an absent presence state in this example) is the second child region in the parent region 506 (because it has the vertex V1 of the parent region 506), so the minority position indication can have bits '01' to indicate the second position. So the child-level data for the four child regions within the parent region 506 can have bits 0101 in this example.

In this example, the bits used to represent the presence indications in the block of presence indications 502 would be the upper level encoding: 0111011101011100, followed by the lower level encoding: 01100001000101-0001010000001100110010100100010010000. For a parent region which has child regions having a mix of presence states, the "parent-level data" can be considered to be the bit in the upper level encoding for the parent region and the "child-level data" can be considered to be the four bits in the lower level encoding to indicate the presence states for the four child regions in the parent region. For a parent region which has child regions which all have the same presence state, the "parent-level data" can be considered to be the bit in the upper level encoding for the parent region and the two bits in the lower level encoding to indicate the presence state for the parent region. Therefore, for a parent region which has child regions which all have the same presence state, the parent-level data includes some data in the upper level encoding plus some data in the lower level encoding, and no child-level data is included in the hierarchical representation.

Without any restrictions on the number of bits used, the maximum amount of bits used by this method would be 80 bits (16 upper level bits and 4 bits per parent region which results in 64 lower level bits adding up to 80) and the minimum amount of bits used would be 48 (16 upper level bits and 2 bits per parent region which results in 32 lower level bits adding up to 48).

In the example given above, the hierarchical representation has 68 bits (16 upper level bits and 52 lower level bits). In some implementations, there may be a target compression ratio for compressing the presence indications. For example, the target compression ratio may be 50%, such that the original 128 bits for the presence indications for 64 sub-primitives is to be compressed down to 64 bits. If the initial hierarchical representation of the block of sub-primitive presence indications has more than a threshold number of bits (e.g. the initial representation described above has 68 bits and the threshold number of bits may be 64), the compression unit 316 may change one or more of the sub-primitive presence states to be partially present, and then determine another hierarchical representation of the block of sub-primitive presence indications that does not have more than the threshold number of bits. This can be done to increase the number of parent regions for which all of the child regions have a partially present presence state. If this changes a parent region from one in which the child regions have a mix of presence states into a parent region in which the child regions all have a partially present presence state, then the number of bits which are used to represent the presence indications of the parent region is reduced by two. In the example above, the presence states of child regions may be changed such that two more parent regions have child regions that all have a partially present presence state. This would reduce the number of bits in the hierarchical representation from 68 to 64, which satisfies the target, i.e. it is not greater than the threshold of 64. Preferably, the child regions for which the presence states are changed would be child regions which do not have partially present presence states but which are in parent regions in which all of the other child regions have a partially present presence state, so that a low number of presence states are changed.

For example, the presence state of the second child region in the parent region 506 may be changed to be partially present, so that all of the child regions in the parent region 506 are partially present. Also, the presence state of the first child region in the third parent region of the first grandparent region (i.e. the child region that shares a diagonal edge with the second child region in the parent region 506) may be changed to be partially present, so that all of the child regions in the third parent region of the first grandparent region are partially present. The hierarchical representation, after the changes to the presence states in this example would be represented with an upper level encoding of 0100011101011100 and a lower level encoding of 0110001010000101000000011001100101001000010010000 (i.e. 16 upper level bits and 48 lower level bits, totaling 64 bits). The bits that have changed relative to the initial hierarchical representation are shown in bold and underlined.

In the example described above with reference to FIGS. 5a to 5c the child regions and the parent regions are triangular. In other examples, the child regions and the parent regions are rectangular (wherein the term "rectangular" includes square). Furthermore, in the example described above with reference to FIGS. 5a to 5c, the two levels of data are used in the hierarchical representation: parent-level data and child-level data. We now go on to describe an example in which three levels of data are used in the hierarchical representation: grandparent-level data, parent-level data and child-level data.

Figure 6A:
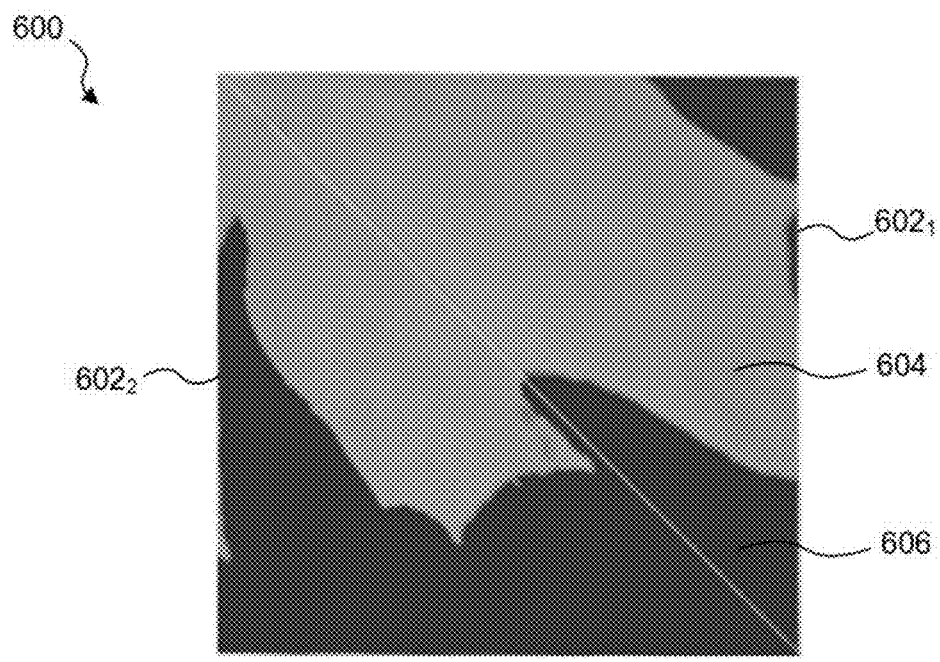
FIG. 6a shows a second object which has partial presence.

In particular, FIG. 6a shows a second object 600 which has partial presence. In this example the object is part of a leaf and is represented with a pair of triangular primitives $602_1$ and $602_2$ that form a quad because they share an edge. A texture is applied to the two primitives. The texture has some regions (e.g. 606) which are transparent, such that they are absent for the purposes of intersection testing. The texture also has some regions (e.g. 604) which are not transparent (e.g. they are opaque), such that they are present for the purposes of intersection testing.

Figure 6B:
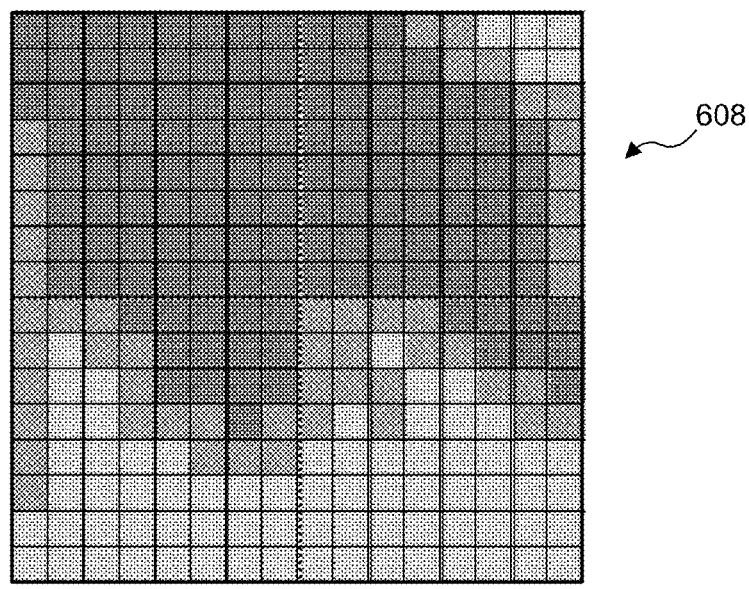
FIG. 6b shows a block of presence indications for the second object shown in FIG. 6a, the block of presence indications comprising 256 presence indications in a 16×16 arrangement.

FIG. 6b shows a block of presence indications 608 for the second object 600 which is received at the compression unit 316. The object 600 is divided into 256 square sub-primitives arranged in a 16×16 square. In other examples, the block may have a different number of sub-primitives and they may be arranged into other shapes (e.g. rectangles). In FIG. 6b each presence indication is represented with one of three hatchings to represent one of the three possible presence states. In particular, presence indications that indicate that a respective sub-primitive is fully present are represented with dark hatching; presence indications that indicate that a respective sub-primitive is fully absent are represented with light hatching; and presence indications that indicate that a respective sub-primitive is partially present are represented with mid-level hatching.

Figure 7:
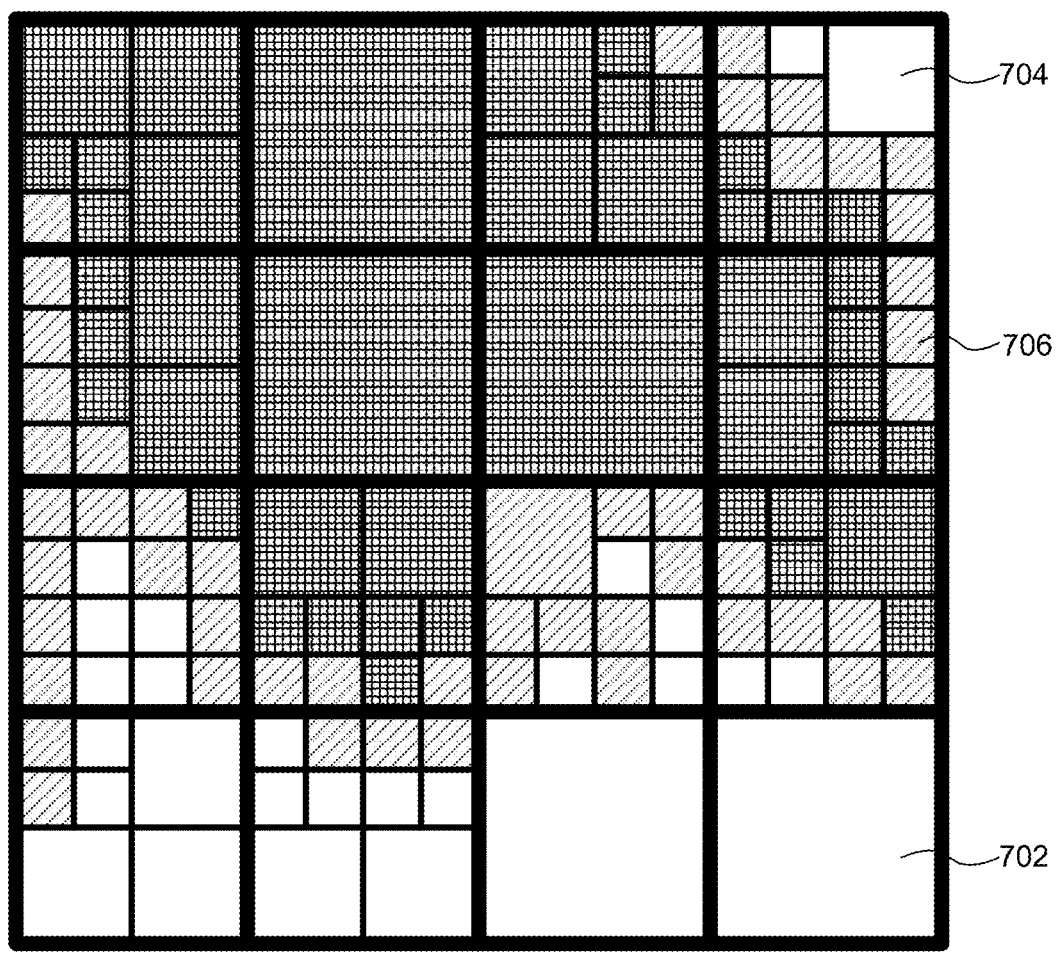
FIG. 7 shows how the presence indications shown in FIG. 6b can be grouped into grandparent regions, parent regions and child regions.

The block of sub-primitive presence indications is subdivided into a plurality of grandparent regions, each of the grandparent regions is subdivided into a plurality of parent regions, and each of the parent regions is subdivided into a plurality of child regions. FIG. 7 shows how the presence indications shown in FIG. 6b can be grouped into grandparent regions, parent regions and child regions. Each of the child regions corresponds to a respective one of the presence indications. One of the grandparent regions is denoted 702 in FIG. 7, one of the parent regions is denoted 704 in FIG. 7 and one of the child regions is denoted 706 in FIG. 7. Each of the grandparent region includes a 2×2 group of parent regions, and each of the parent regions includes a 2×2 group of child regions.

In FIG. 7, a region with a fully absent presence state is represented with no hatching, a region with a fully present presence state is represented with cross-hatching, and a region with a partially present presence state is represented with diagonal hatching. If all of the child regions within all of the parent regions within a grandparent region have the same presence state then FIG. 7 just shows the grandparent region (e.g. grandparent region 702, which corresponds to the 4×4 group of child regions in the bottom right corner of the block of sub-primitive presence indications, which are all fully absent as shown in FIG. 6b). If all of the child regions within a parent region have the same presence state, but the parent region is within a grandparent region for which it is not the case that all of the child regions within all of the parent regions within the grandparent region have the same presence state, then FIG. 7 shows the parent region (e.g. parent region 704, which corresponds to the 2×2 group of child regions in the top right corner of the block of sub-primitive presence indications, which are all fully absent as shown in FIG. 6b). If it is not the case that all of the child regions within a parent region have the same presence state, then FIG. 7 shows the child region (e.g. child region 706, which corresponds to the $16^{th}$ child region in the $6^{th}$ row of the block of sub-primitive presence indications, which is fully absent as shown in FIG. 6b)

Figure 8:
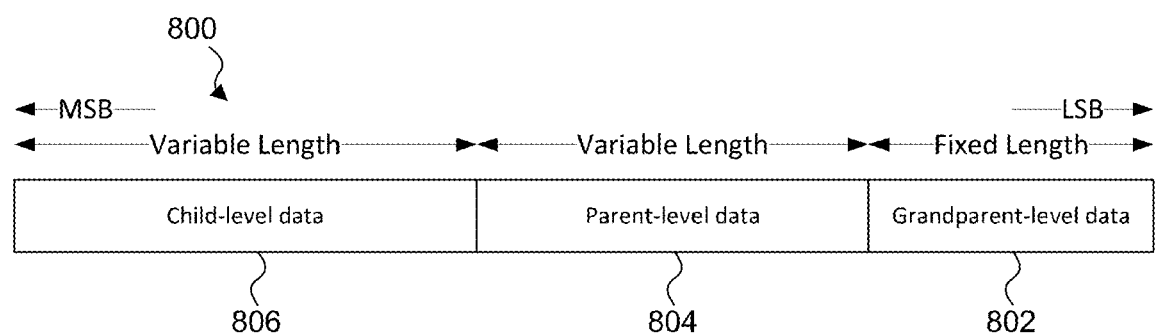
FIG. 8 shows a block of compressed data.

FIG. 8 shows a block of compressed data 800 for storing the hierarchical representation of the block of presence indications. The block of compressed data 800 includes a grandparent-level data field 802 for storing grandparent-level data, a parent-level data field 804 for storing parent-level data and a child-level data field 806 for storing child-level data. As shown in the example in FIG. 8, the grandparent-level data field 802 has a fixed length which does not depend upon the data being compressed, but the parent-level data field 804 and the child-level data field have variable lengths which depend upon the data being compressed.

For each of one or more grandparent regions whose parent regions all have child regions within them which all have the same identified presence state, grandparent-level data is included in the grandparent-level data field 802 of the hierarchical representation to represent the presence state of the grandparent region without parent-level data or child-level data for the parent regions or child regions within the grandparent region being included in the hierarchical representation. For each of one or more grandparent regions whose parent regions do not all have child regions within them which all have the same identified presence state, parent-level data is included in the parent-level data field 804 of the hierarchical representation to represent the presence state of the parent regions within the grandparent region. For each of one or more parent regions whose child regions all have the same identified presence state, parent-level data is included in the hierarchical representation to represent the presence state of the parent region without child-level data for the child regions within the parent region being included in the hierarchical representation. For each of one or more parent regions whose child regions do not all have the same identified presence state, child-level data for the child regions within the parent region is included in the hierarchical representation to represent the presence states for the child regions within the parent region.

Figure 9A:
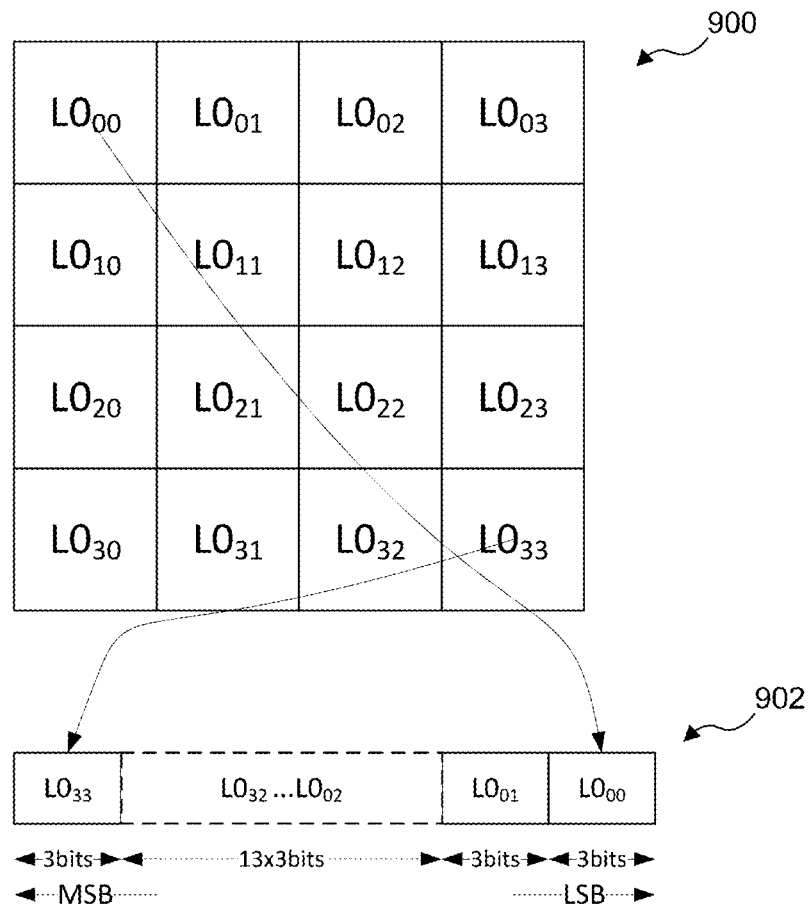
FIG. 9a illustrates how grandparent-level data can be included in the block of compressed data.

For example, the 16 grandparent regions can each be one of six different categories, so the grandparent-level data can include 16, three-bit fields. FIG. 9a illustrates how grandparent-level data can be included in the grandparent-level data field 902 of the block of compressed data. In particular, FIG. 9a shows the 16×16 arrangement of grandparent regions 900. Each grandparent region is referred to as an "L0" region or "Level 0" region. The grandparent-level data is included in the grandparent-level data field 902 for respective grandparent regions according to a predetermined ordering. The ordering of the grandparent regions may be raster scan order (i.e. left to right, top to bottom order, as shown in FIG. 9a) or Morton order, or some other predetermined ordering.

The grandparent-level data representing a presence state of a grandparent region indicates one of six things:
(i) all of the child regions within all of the parent regions within the grandparent region are fully present, which can be denoted as "P" and may be represented with bits '000';
(ii) all of the child regions within all of the parent regions within the grandparent region are fully absent, which can be denoted as "A" and may be represented with bits '010';
(iii) all of the child regions within all of the parent regions within the grandparent region are partially present, which can be denoted as "C" and may be represented with bits '100' (where "C" stands for "check texture" which is what happens for a sub-primitive with a partially present presence state);
(iv) all of the child regions within the parent regions within the grandparent region are either fully present or partially present, which can be denoted as "PC" and may be represented with bits '001';
(v) all of the child regions within the parent regions within the grandparent region are either fully absent or partially present, which can be denoted as "CA" and may be represented with bits '011'; or
(vi) the child regions within the parent regions within the grandparent region have a mix of fully present, fully absent and partially present presence states, which can be denoted as "PCA" and may be represented with bits '110'.

It is noted that it is not possible for a grandparent region to be state PA. This is because, due to the finite gradients in the alpha channel, it is not possible for two connected regions to have respective presence states of fully present and fully absent. Therefore, if a grandparent region includes child regions that are fully present and child regions that are fully absent then it must also include at least one child region that is partially present, so a grandparent region can have a CPA state, but not a PA state.

Figure 9B:
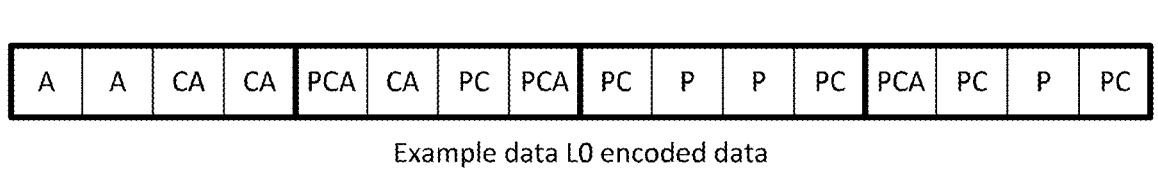
FIG. 9b shows an example of grandparent-level data for the block of presence indications shown in FIG. 7.

FIG. 9b shows an example of grandparent-level data 904 for the block of presence indications shown in FIG. 7. This grandparent-level data 904 uses 48 bits when each of the indications uses 3 bits, as described above. In another example, some of the indications used for the grandparent-level data could have 2 bits. For example, in the example given above, only options (iv) and (v) (i.e. the PC and CA options) have a 1 as the LSB: the other four options have a 0 as the LSB. So it would be possible to represent the PC state with bits '01' and to represent the CA state with bits '11'. In the example shown in FIG. 9b there are five grandparent regions with the PC state and three grandparent regions with the CA state, so this encoding would reduce the number of grandparent bits in this example from 48 bits to 40 bits. However, this approach means that the grandparent-level data field would no longer be fixed length, i.e. it would have a variable length dependent upon the data. Making the grandparent-level data field variable length would increase the complexity of the decoding process, so it may be considered preferable to use the fixed length encoding approach described above in which each grandparent region is represented with 3 bits of grandparent-level data, even though this might not compress the data by quite as much as the variable length approach.

Figure 10:
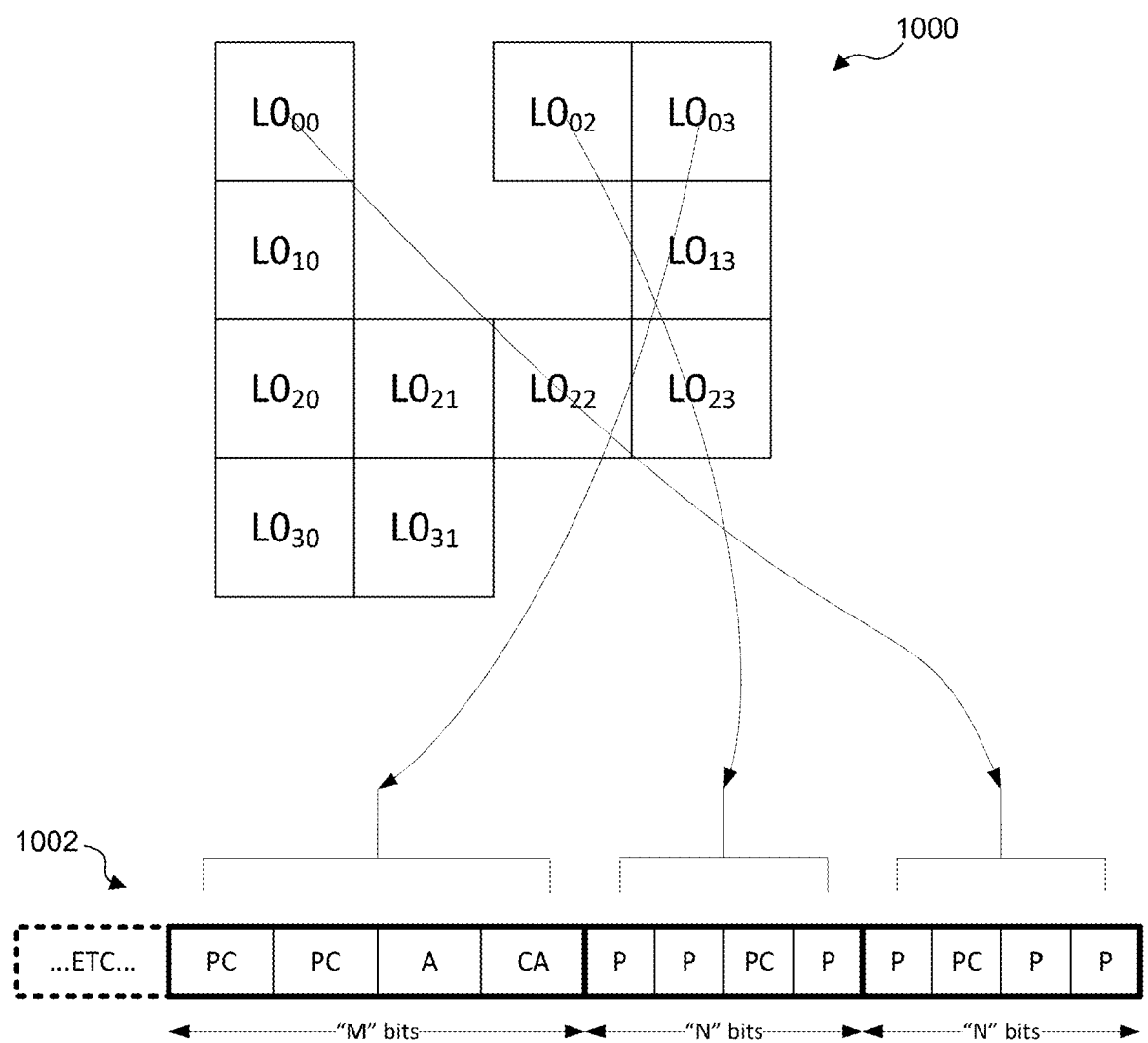
FIG. 10 illustrates how parent-level data can be included in the block of compressed data for the block of presence indications shown in FIG. 7.

No parent-level or child-level data needs to be stored for grandparent regions that are encoded as P, A or C, so these grandparent regions are removed from consideration when determining what parent-level data to store in the parent-level data field 804. FIG. 10 shows the remaining grandparent regions 1000 and illustrates how parent-level data can be included in the parent-level data field 1002 in the block of compressed data for the block of presence indications shown in FIG. 7. It can be seen in FIG. 10 that no parent-level data is stored for grandparent regions that are encoded as P, A or C.

For a parent region within a PC grandparent region whose grandparent-level data indicates that all of the child regions within the parent regions within the grandparent region are either fully present or partially present, parent-level data representing a presence state of the parent region indicates that:
(i) all of the child regions within the parent region are fully present, which can be denoted as "P",
(ii) all of the child regions within the parent region are partially present, which can be denoted as "C", or
(iii) the child regions within the parent region have a mix of fully present and partially present presence states, which can be denoted as "PC".

The L0$_{00}$ grandparent region is a PC region, and FIG. 10 shows that the parent-level data for the four parent regions within this grandparent region is stored with N bits in the parent-level data field 1002. As an example, N could be 8, where 2 bits are used to indicate one of the three options (P, C or PC) listed above for each of the four parent regions. However, it is noted that since there are only three options for each of the four parent regions, and we know that it cannot be the case that all four parent regions are state P or that all four parent regions are state C (otherwise the grandparent region would not have been encoded as PC), so the total number of options for the states for the four parent regions in the PC grandparent region is $3^4-2=79$. With 7 bits, 128 different options can be encoded (since $2^7=128$), so 7 bits in the parent-level data field 1002 is enough to represent the states for the four parent regions in the PC grandparent region, e.g. using a Look Up Table (LUT) approach.

For a parent region within a CA grandparent region whose grandparent-level data indicates that all of the child regions within the parent regions within the grandparent region are either fully absent or partially present, parent-level data representing a presence state of the parent region indicates that:
(i) all of the child regions within the parent region are fully absent, which can be denoted as "A",
(ii) all of the child regions within the parent region are partially present, which can be denoted as "C", or
(iii) the child regions within the parent region have a mix of fully absent and partially present presence states, which can be denoted as "CA".

The parent-level data for the four parent regions within a CA grandparent region is stored with N bits in the parent-level data field 1002. As an example, N could be 8, where 2 bits are used to indicate one of the three options (A, C or CA) listed above for each of the four parent regions. However, it is noted that since there are only three options for each of the four parent regions, and we know that it cannot be the case that all four parent regions are state A or that all four parent regions are state C (otherwise the grandparent region would not have been encoded as CA), so the total number of options for the states for the four parent regions in the CA grandparent region is $3^4-2=79$. With 7 bits, 128 different options can be encoded (since $2^7=128$), so 7 bits in the parent-level data field 1002 is enough to represent the states for the four parent regions in the CA grandparent region, e.g. using a Look Up Table (LUT) approach.

For a parent region within a PCA grandparent region whose grandparent-level data indicates that the child regions within the parent regions within the grandparent region have a mix of fully present, fully absent and partially present presence states, parent-level data representing a presence state of the parent region indicates that:
(i) all of the child regions within the parent region are fully present, which can be denoted as "P",
(ii) all of the child regions within the parent region are fully absent, which can be denoted as "A",
(iii) all of the child regions within the parent region are partially present, which can be denoted as "C",
(iv) the child regions within the parent region have a mix of fully present and partially present presence states, which can be denoted as "PC", or
(v) the child regions within the parent region have a mix of fully absent and partially present presence states, which can be denoted as "CA".

It is noted that it is not possible for a parent region to be state PCA or PA. This is because, due to the finite gradients in the alpha channel, it is not possible for two connected regions to have respective presence states of fully present and fully absent.

The L0$_{03}$ grandparent region is a PCA region, and FIG. 10 shows that the parent-level data for the four parent regions within this grandparent region is stored with M bits in the parent-level data field 1002. As an example, M could be 12, where 3 bits are used to indicate one of the five options (P, C, A, PC or CA) listed above for each of the four parent regions. However, it is noted that since there are only five options for each of the four parent regions, and we know that some of the options ($3^4$ of the options) are not possible for a grandparent region which is encoded as PCA, so the total number of options for the states for the four parent regions in the PCA grandparent region is $5^4-3^4=544$. With 10 bits, 1024 different options can be encoded (since $2^{10}=1024$), so 10 bits in the parent-level data field 1002 is enough to represent the states for the four parent regions in the PCA grandparent region, e.g. using a Look Up Table (LUT) approach.

Figure 11:
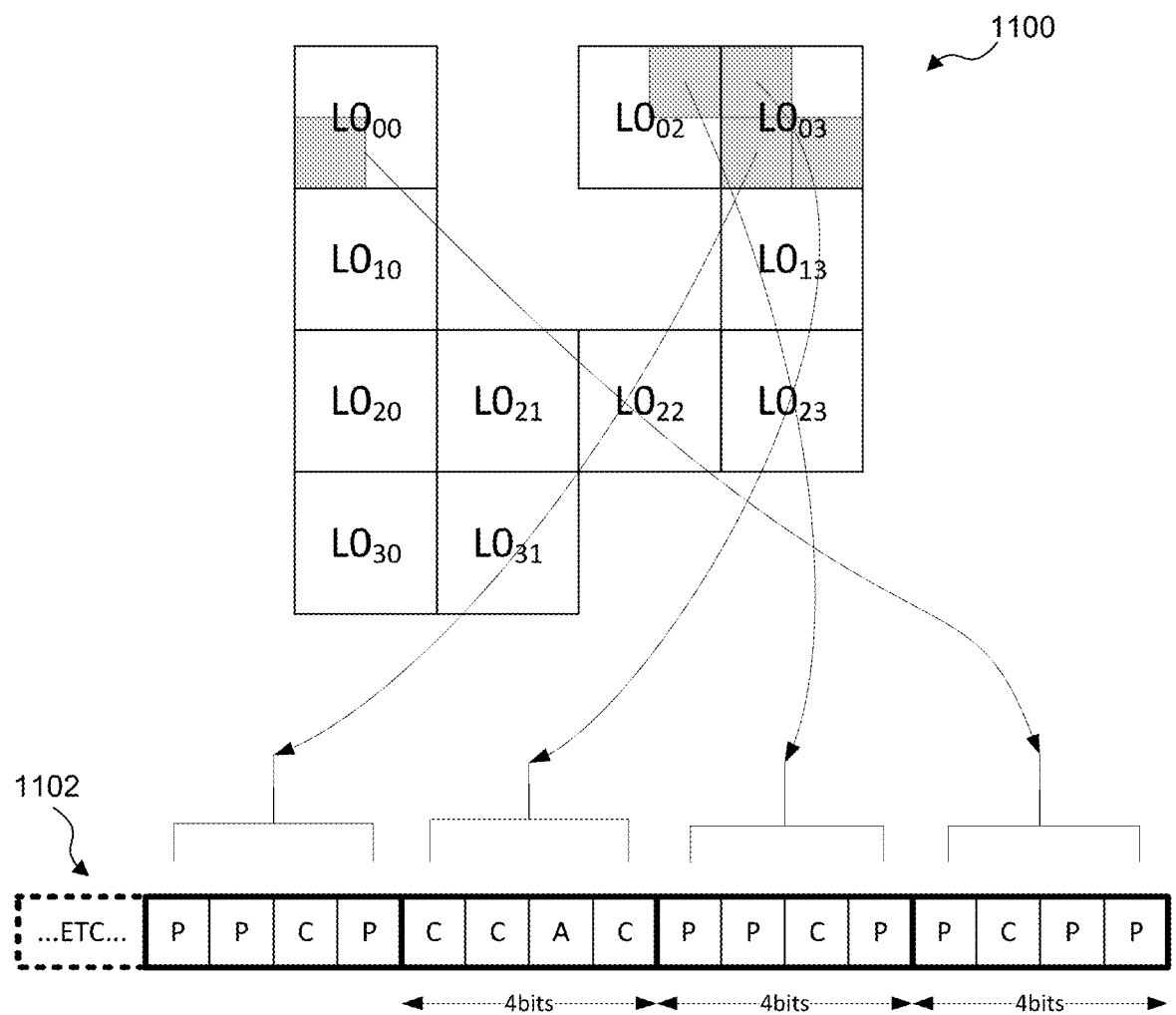
FIG. 11 illustrates how child-level data can be included in the block of compressed data for the block of presence indications shown in FIG. 7.

No child-level data needs to be stored for parent regions that are encoded as P, A or C, so these parent regions are removed from consideration when determining what child-level data to store in the child-level data field 806. FIG. 11 shows the remaining grandparent regions 1100, highlighting in grey the remaining parent regions, and illustrates how child-level data can be included in the child-level data field 1102 in the block of compressed data for the block of presence indications shown in FIG. 7. It can be seen in FIG. 11 that no child-level data is stored for parent regions that are encoded as P, A or C.

For a child region within a PC parent region whose parent-level data indicates that the child regions within the parent region have a mix of fully present and partially present presence states, child-level data representing a presence state of the child region indicates whether the child region has a fully present or partially present presence state. One bit of child-level data can be used for each child region to indicate one of the two options.

For a child region within a CA parent region whose parent-level data indicates that the child regions within the parent region have a mix of fully absent and partially present presence states, child-level data representing a presence state of the child region indicates whether the child region has a fully absent or partially present presence state. One bit of child-level data can be used for each child region to indicate one of the two options.

This method produces compressed data ranging from 48 bits (16 grandparent regions, each taking 3 bits and no parent or child regions) to 464 bits (16 grandparent regions, all giving PCA result, each taking 3 bits adding up to 48 bits, 10 bits per grandparent region to express the parent regions, all of them adding up to 160 bits. For each of the 64 parent regions 4 bits to express the children adding up to 256 bits). It should be noted the maximum amount of bits would require extremely specific conditions to achieve.

A first method, performed by the decompression unit 318, of decompressing compressed data to determine one or more sub-primitive presence indications for use in intersection testing in a ray tracing system is described with reference to the flow chart in FIG. 12. The first method is used to decompress data that was compressed using the method described above with reference to FIGS. 5a to 5c. The decompression process described with reference to FIG. 12 is fairly simple to implement, so the latency and power consumption of the decompression unit 318 is low (e.g. it can be implemented in real-time during an intersection testing process), and if the decompression unit is implemented in hardware then the silicon area is low.

In step S1202 the decompression unit 318 receives a block of compressed data for a block of sub-primitive presence indications. The block of sub-primitive presence indications has been generated as described above with reference to FIGS. 5a to 5c. As such, the block of sub-primitive presence indications is subdivided into a plurality of parent regions, each of the parent regions being subdivided into a plurality of child regions, wherein the block of compressed data comprises a hierarchical representation of the block of sub-primitive presence indications. As described above, according to the hierarchical representation, for each of one or more parent regions whose child regions all have the same presence state, parent-level data is included in the hierarchical representation to represent the presence state of the parent region without child-level data for the child regions within the parent region being included in the hierarchical representation. Furthermore, as described above, according to the hierarchical representation, for each of one or more parent regions whose child regions do not all have the same presence state, child-level data for the child regions within the parent region is included in the hierarchical representation to represent the presence states for the child regions within the parent region.

In step S1204 the decompression unit 318 receives an indication of a sample position within the block of sub-primitive presence indications for which a presence indication is to be determined. The sample position indication may comprise two coordinates (x,y) to indicate a position within the block of sub-primitive presence indications.

Figure 12:
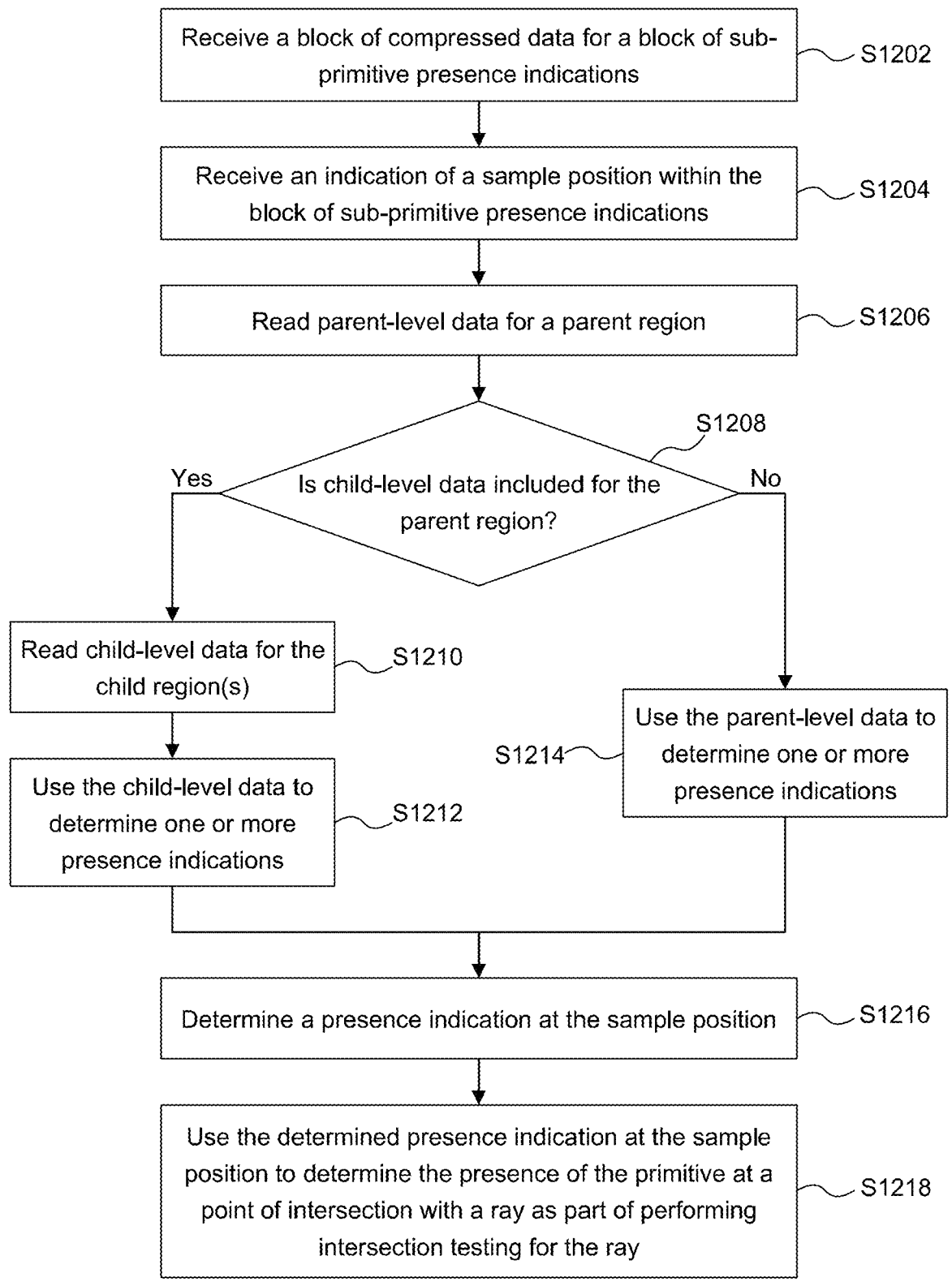
FIG. 12 is a flow chart for a first method of decompressing compressed data to determine sub-primitive presence indications for use in intersection testing.

In the example shown in FIG. 12, the decompression unit 318 is decompressing data that was compressed according to the method described above with reference to FIGS. 5a to 5c, in which the hierarchical representation of the presence indications has two levels: a parent level and a child level. In step S1206 the decompression unit 318 reads parent-level data for one of the parent regions from the block of compressed data. The parent region for which parent-level data is read may be the parent region in which the sample position is located.

In step S1208 the decompression unit 318 determines whether child-level data is included in the hierarchical representation for the parent region for which parent-level data was read in step S1206. As described above in the example shown in FIGS. 5a to 5c, the upper level data includes one bit for each of the parent regions (e.g. parent region 506), which indicates whether or not all of the child regions within that parent region have the same presence state. For example, if the parent-level data that was read in step S1206 for the parent region is a '1' (indicating that the child regions within the parent region have a mix of different presence states) then the method passes from step S1208 to step S1210; whereas if the parent-level data that was read in step S1206 for the parent region is a '0' (indicating that all of the child regions within the parent region have the same presence state) then the method passes from step S1208 to step S1214.

In step S1210 (which is performed if it is determined in step S1208 that child-level data is included in the hierarchical representation for the parent region), the decompression unit 318 reads the child-level data for one or more of the child regions in the parent region. Then in step S1212 the decompression unit 318 uses the child-level data to determine one or more sub-primitive presence indications in the parent region. As described above in the example with reference to FIGS. 5a to 5c, if the upper level bit for the parent region is a 1 then there are four bits of child-level data in the lower level encoding to represent the presence states of the four child regions within the parent region. As described above, two of the four child-level data bits may indicate a palette indication and the other two of the four child-level data bits may indicate a minority position indication. In this case, step S1210 comprises reading a palette indication from the child-level data for said one of the parent regions which indicates that one of: (i) a majority of the child regions (i.e. three of the four child regions) in the parent region have a partially present presence state and a minority of the child regions (i.e. one of the four child regions) in the parent region have a fully present presence state, (ii) a majority of the child regions (i.e. three of the four child regions) in the parent region have a partially present presence state and a minority of the child regions (i.e. one of the four child regions) in the parent region have a fully absent presence state, (iii) a majority of the child regions (i.e. three of the four child regions) in the parent region have a fully present presence state and a minority of the child regions (i.e. one of the four child regions) in the parent region have a partially present presence state, and (iv) a majority of the child regions (i.e. three of the four child regions) in the parent region have a fully absent presence state and a minority of the child regions (i.e. one of the four child regions) in the parent region have a partially present presence state. Step S1210 also comprises reading the minority position indication from the child-level data for the parent region which indicates the position of the minority of the four child regions within the parent region. Step S1212 comprises using the read palette indication and the read minority position indication to determine the one or more sub-primitive presence indications in said one of the parent regions. The method passes from step S1212 to step S1216.

In step S1214 (which is performed if it is determined in step S1208 that child-level data is not included in the hierarchical representation for the parent region), the decompression unit 318 uses the parent-level data for the parent region, without child-level data, to determine one or more sub-primitive presence indications in the parent region. For example, a sub-primitive presence indication may be determined for the parent region in which the sample position is located. As described above in the example with reference to FIGS. 5a to 5c, if the upper level bit for the parent region is a 0 then there are two bits (or possibly just one bit in some examples) of parent-level data in the lower level encoding to represent the presence state of the parent region. The method passes from step S1214 to step S1216.

In step S1216 the decompression unit 318 determines a presence indication for the sample position (for which an indication was received in step S1204) using one or more of the determined sub-primitive presence indications in the block of sub-primitive presence indications. As described above, each of the child regions may correspond with a respective one of the sub-primitive presence indications in the block of sub-primitive presence indications, so step S1216 can involve determining which of the sub-primitives the sample position is within and identifying the determined presence indication for the child region corresponding to the sub-primitive in which the sample position is located or identifying the determined presence indication for the parent region which includes the child region corresponding to the sub-primitive in which the sample position is located.

In step S1218 the decompression unit 318 outputs the determined presence indication at the sample position. The determined presence indication presence indication at the sample position can be used to determine the presence of a primitive at a point of intersection with a ray as part of performing intersection testing for the ray in the ray tracing system.

A second method, performed by the decompression unit 318, of decompressing compressed data to determine one or more sub-primitive presence indications for use in intersection testing in a ray tracing system is described with reference to the flow chart in FIG. 13. The second method is used to decompress data that was compressed using the method described above with reference to FIGS. 6a to 11. The decompression process described with reference to FIG. 13 is fairly simple to implement, so the latency and power consumption of the decompression unit 318 is low (e.g. it can be implemented in real-time during an intersection testing process), and if the decompression unit is implemented in hardware then the silicon area is low.

In step S1302 the decompression unit 318 receives a block of compressed data for a block of sub-primitive presence indications. The block of sub-primitive presence indications has been generated as described above with reference to FIGS. 6a to 11. As such, the block of sub-primitive presence indications is subdivided into a plurality of grandparent region, each of which is subdivided into a plurality of parent regions, each of the parent regions being subdivided into a plurality of child regions, wherein the block of compressed data (e.g. 800) comprises a hierarchical representation of the block of sub-primitive presence indications. The block of compressed data 800 comprises grandparent-level data in the grandparent-level data field 802, parent-level data in the parent-level data field 804 and child-level data in the child-level data field 806. As described above, according to the hierarchical representation, for each of one or more grandparent regions whose parent regions all have child regions which all have the same presence state, grandparent-level data is included in the grandparent-level data field 802 of the hierarchical representation to represent the presence state of the grandparent region without parent-level data or child-level data being included in the hierarchical representation for the grandparent region. For a parent region whose presence is not entirely represented with grandparent-level data and whose child regions all have the same presence state, parent-level data is included in the hierarchical representation to represent the presence state of the parent region without child-level data for the child regions within the parent region being included in the hierarchical representation. Furthermore, as described above, according to the hierarchical representation, for each of one or more parent regions whose child regions do not all have the same presence state, child-level data for the child regions within the parent region is included in the hierarchical representation to represent the presence states for the child regions within the parent region.

In step S1304 the decompression unit 318 receives an indication of a sample position within the block of sub-primitive presence indications for which a presence indication is to be determined.

Figure 13:
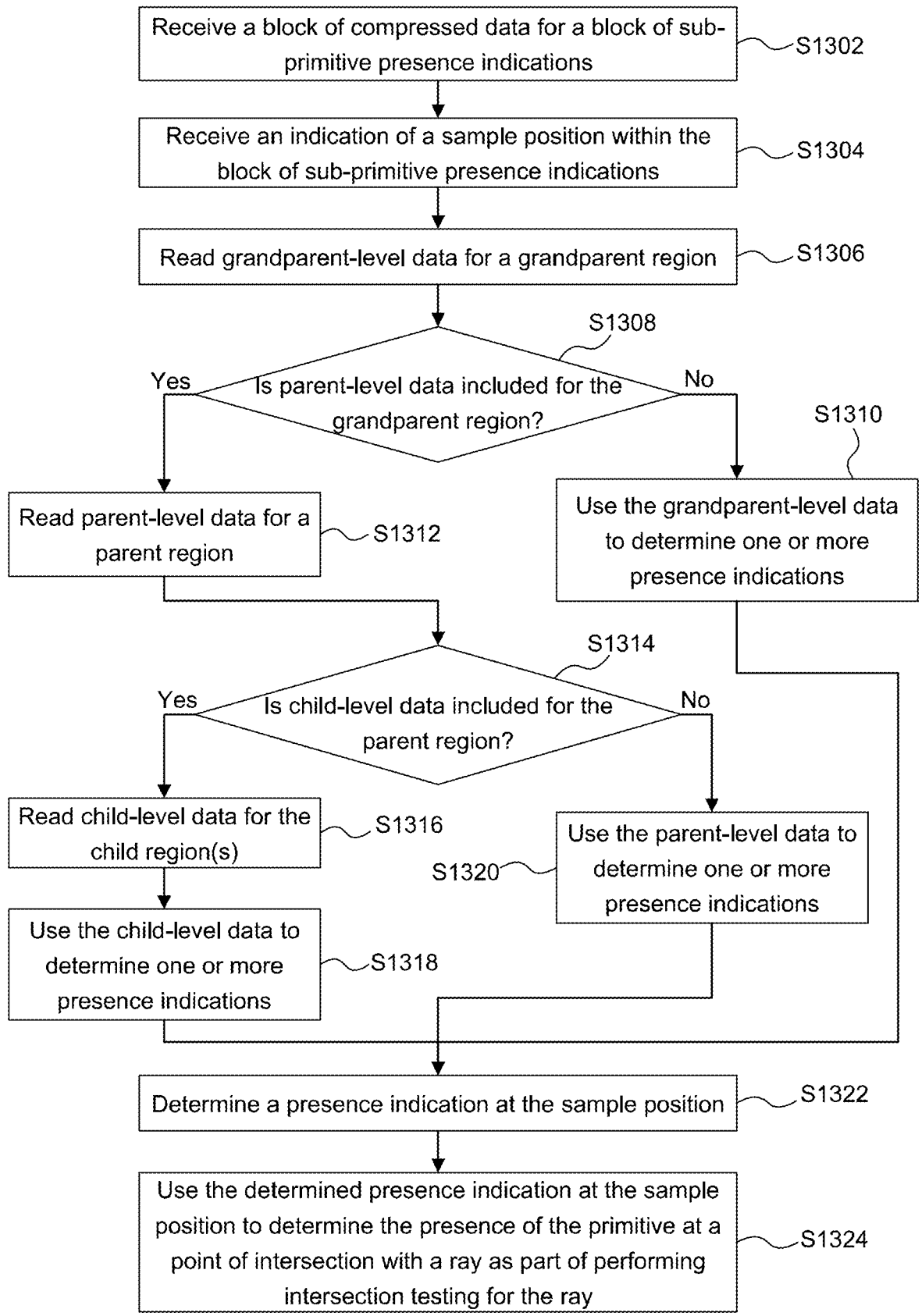
FIG. 13 is a flow chart for a second method of decompressing compressed data to determine sub-primitive presence indications for use in intersection testing.

In the example shown in FIG. 13, the decompression unit 318 is compressing data that was compressed according to the method described above with reference to FIGS. 6a to 11, in which the hierarchical representation of the presence indications has three levels: a grandparent level, a parent level and a child level. In step S1306 the decompression unit 318 reads grandparent-level data for one of the grandparent regions from the block of compressed data. The grandparent region for which grandparent-level data is read may be the grandparent region in which the sample position is located.

In step S1308 the decompression unit 318 determines whether parent-level data is included in the hierarchical representation for the grandparent region for which grandparent-level data was read in step S1306. As described above in the example shown in FIGS. 6a to 11, the grandparent-level data represents a presence state of a grandparent region by indicating: (i) that all of the child regions within all of the parent regions within the grandparent region are fully present, which is denoted as 'P', (ii) that all of the child regions within all of the parent regions within the grandparent region are fully absent, which is denoted as 'A', (iii) that all of the child regions within all of the parent regions within the grandparent region are partially present, which is denoted as 'C', (iv) that all of the child regions within the parent regions within the grandparent region are either fully present or partially present, which is denoted as 'PC', (v) that all of the child regions within the parent regions within the grandparent region are either fully absent or partially present, which is denoted as 'CA', or (vi) that the child regions within the parent regions within the grandparent region have a mix of fully present, fully absent and partially present presence states, which is denoted as 'PCA'. For grandparent-level data representing a presence state of a grandparent region indicating (i), (ii) or (iii), it is determined in step S1308 that parent-level data is not included in the hierarchical representation for the grandparent region, and the method passes from step S1308 to step S1310. For grandparent-level data representing a presence state of a grandparent region indicating (iv), (v) or (vi), it is determined in step S1308 that parent-level data is included in the hierarchical representation for the grandparent region, and the method passes from step S1308 to step S1312.

In step S1310 (which is performed if it is determined in step S1308 that parent-level data is not included in the hierarchical representation for the grandparent region), the decompression unit 318 uses the grandparent-level data for the grandparent region, without parent-level data, to determine one or more sub-primitive presence indications in the grandparent region. For example, for a grandparent region with a P state the one or more sub-primitive presence indications in the grandparent region are determined to have a fully present presence state; for a grandparent region with an A state the one or more sub-primitive presence indications in the grandparent region are determined to have a fully absent presence state; and for a grandparent region with a C state the one or more sub-primitive presence indications in the grandparent region are determined to have a partially present presence state. The method passes from step S1310 to step S1322 without performing steps S1312 to S1320.

In step S1312 (which is performed if it is determined in step S1308 that parent-level data is included in the hierarchical representation for the grandparent region), the decompression unit 318 reads the parent-level data from the parent-level data field 804 for one or more of the parent regions in the grandparent region. The parent-level data is used to determine one or more sub-primitive presence indications in the grandparent region.

In particular, in step S1314 the decompression unit 318 determines whether child-level data is included in the hierarchical representation for the parent region for which parent-level data was read in step S1312.

As described above, for a parent region within a PC grandparent region, parent-level data representing a presence state of the parent region indicates: (i) that all of the child regions within the parent region are fully present, which is denoted as a 'P' state, (ii) that all of the child regions within the parent region are partially present, which is denoted as a 'C' state, or (iii) that the child regions within the parent region have a mix of fully present and partially present presence states, which is denoted as a 'PC' state. For a P parent region or a C parent region, it is determined in step S1314 that child-level data is not included in the hierarchical representation for the parent region, and the method passes from step S1314 to step S1320. For a PC parent region, it is determined in step S1314 that child-level data is included in the hierarchical representation for the parent region, and the method passes from step S1314 to step S1316.

As described above, for a parent region within a CA grandparent region, parent-level data representing a presence state of the parent region indicates: (i) that all of the child regions within the parent region are fully absent, which is denoted as a 'A' state, (ii) that all of the child regions within the parent region are partially present, which is denoted as a 'C' state, or (iii) that the child regions within the parent region have a mix of fully absent and partially present presence states, which is denoted as a 'CA' state. For an A parent region or a C parent region, it is determined in step S1314 that child-level data is not included in the hierarchical representation for the parent region, and the method passes from step S1314 to step S1320. For a CA parent region, it is determined in step S1314 that child-level data is included in the hierarchical representation for the parent region, and the method passes from step S1314 to step S1316.

As described above, for a parent region within a PCA grandparent region, parent-level data representing a presence state of the parent region indicates: (i) that all of the child regions within the parent region are fully present, which is denoted as a 'P' state, (ii) that all of the child regions within the parent region are fully absent, which is denoted as a 'A' state, (iii) that all of the child regions within the parent region are partially present, which is denoted as a 'C' state, (iv) that the child regions within the parent region have a mix of fully present and partially present presence states, which is denoted as a 'PC' state, or (v) that the child regions within the parent region have a mix of fully absent and partially present presence states, which is denoted as a 'CA' state. For a P parent region, a C parent region or an A parent region, it is determined in step S1314 that child-level data is not included in the hierarchical representation for the parent region, and the method passes from step S1314 to step S1320. For a PC parent region or a CA parent region, it is determined in step S1314 that child-level data is included in the hierarchical representation for the parent region, and the method passes from step S1314 to step S1316.

In step S1316 (which is performed if it is determined in step S1314 that child-level data is included in the hierarchical representation for the parent region), the decompression unit 318 reads the child-level data for one or more of the child regions in the parent region. Then in step S1318 the decompression unit 318 uses the child-level data to determine one or more sub-primitive presence indications in the parent region. For a child region within a PC parent region, child-level data representing a presence state of the child region indicates (e.g. with 1 bit) whether the child region has a fully present or partially present presence state. For a child region within a CA parent region, child-level data representing a presence state of the child region indicates (e.g. with 1 bit) whether the child region has a fully absent or partially present presence state. The method passes from step S1318 to step S1322.

In step S1320 (which is performed if it is determined in step S1314 that child-level data is not included in the hierarchical representation for the parent region), the decompression unit 318 uses the parent-level data for the parent region, without child-level data, to determine one or more sub-primitive presence indications in the parent region. For example, for a parent region with a P state the one or more sub-primitive presence indications in the parent region are determined to have a fully present presence state; for a parent region with an A state the one or more sub-primitive presence indications in the parent region are determined to have a fully absent presence state; and for a parent region with a C state the one or more sub-primitive presence indications in the parent region are determined to have a partially present presence state. The method passes from step S1320 to step S1322.

In step S1322 the decompression unit 318 determines a presence indication for the sample position (for which an indication was received in step S1304) using one or more of the determined sub-primitive presence indications in the block of sub-primitive presence indications. As described above, each of the child regions may correspond with a respective one of the sub-primitive presence indications in the block of sub-primitive presence indications, so step S1322 can involve determining which of the sub-primitives the sample position is within and identifying one of: (i) the determined presence indication for the child region corresponding to the sub-primitive in which the sample position is located, (ii) the determined presence indication for the parent region which includes the child region corresponding to the sub-primitive in which the sample position is located, and (iii) the determined presence indication for the grandparent region which includes the child region corresponding to the sub-primitive in which the sample position is located.

In step S1324 the decompression unit 318 outputs the determined presence indication at the sample position. The determined presence indication presence indication at the sample position can be used to determine the presence of a primitive at a point of intersection with a ray as part of performing intersection testing for the ray in the ray tracing system.

It is to be understood that the specific numbers in the examples described herein (e.g. the number of sub-primitive presence indications in a block of sub-primitive presence indications, the number of grandparent regions in the block, the number of parent regions within a grandparent region and the number of child regions within a parent region) are given by way of example, and in other implementations these numbers could be different.

Further, the examples provided herein use triangles and barycentric coordinates, but the schemes presented herein are also applicable to a surface that can be represented parametrically, e.g. tensor product patches such as bicubic patches, a sphere, or a (portion of) a surface of revolution or extrusion. The parameters can be used to index into the presence indications.

The main examples described herein have used the presence indications for the acceleration of ray tracing, but the method is also applicable to other rendering techniques, e.g. rasterisation. As mentioned in the background section above, GB patents 2538856 and 2522868 describe the use of an opacity state map to accelerate the processing of punch through primitives in a rasterisation system. In particular, the opacity state map is used to indicate whether blocks of texels of a texture are fully opaque, fully transparent, partially transparent or a mixture of these states. The indications in the opacity state map can be used to accelerate the processing of punch through polygons in a rasterization system. Similar to the presence indications described above with reference to a ray tracing system, each of the opacity states in the rasterization system of GB2538856B and GB2522868B is represented with two bits. The methods of compression/decompression of the presence indications described herein can also be applied to compress/decompress the indications of the opacity states in a rasterization system such as that described in GB2538856B and GB2522868B. The 'partially transparent' state and the 'mixture' state can be combined into a single state so that there are just three states, which can then be compressed/decompressed in the same way as for the fully present, partially present and fully absent presence states in the ray tracing systems described above.

Figure 14:
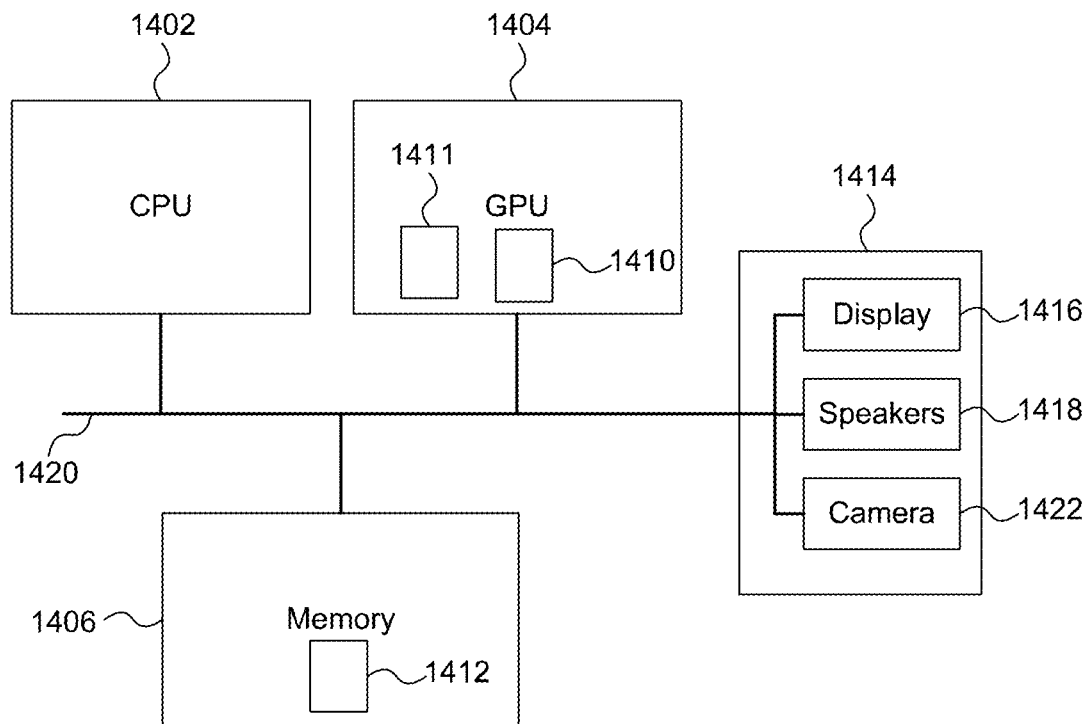
FIG. 14 shows a computer system in which a compression unit and/or a decompression unit is implemented.

FIG. 14 shows a computer system in which the compression and decompression units described herein may be implemented. The computer system comprises a CPU 1402, a GPU 1404, a memory 1406 and other devices 1414, such as a display 1416, speakers 1418 and a camera 1422. A processing block 1410 (corresponding to the ray tracing unit 302) is implemented on the GPU 1404, as well as a Neural Network Accelerator (NNA) 1411. In other examples, the processing block 1410 may be implemented on the CPU 1402 or within the NNA 1411. The components of the computer system can communicate with each other via a communications bus 1420. A store 1412 (corresponding to memory 304) is implemented as part of the memory 1406.

While FIG. 14 illustrates one implementation of a graphics processing system, it will be understood that a similar block diagram could be drawn for an artificial intelligence accelerator system—for example, by replacing either the CPU 1402 or the GPU 1404 with a Neural Network Accelerator (NNA) 1411, or by adding the NNA as a separate unit. In such cases, again, the processing block 1410 can be implemented in the NNA.

The ray tracing unit of FIG. 3 is shown as comprising a number of functional blocks. This is schematic only and is not intended to define a strict division between different logic elements of such entities. Each functional block may be provided in any suitable manner. It is to be understood that intermediate values described herein as being formed by a compression and/or decompression unit need not be physically generated by the compression and/or decompression unit at any point and may merely represent logical values which conveniently describe the processing performed by the compression and/or decompression unit between its input and output.

The compression and/or decompression units described herein may be embodied in hardware on an integrated circuit. The compression and/or decompression units described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be or comprise any kind of general purpose or dedicated processor, such as a CPU, GPU, NNA, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a compression and/or decompression unit configured to perform any of the methods described herein, or to manufacture a compression and/or decompression unit comprising any apparatus described herein. An integrated circuit definition dataset may be, for example, an integrated circuit description.

Therefore, there may be provided a method of manufacturing, at an integrated circuit manufacturing system, a compression and/or decompression unit as described herein. Furthermore, there may be provided an integrated circuit definition dataset that, when processed in an integrated circuit manufacturing system, causes the method of manufacturing a compression and/or decompression unit to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a compression and/or decompression unit will now be described with respect to FIG. 15.

Figure 15:
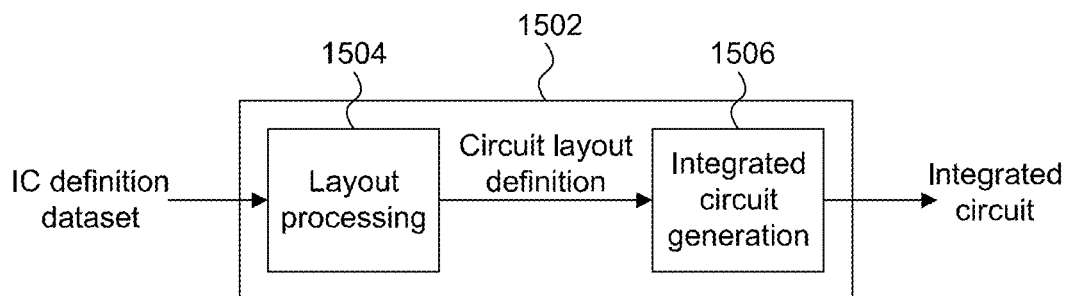
FIG. 15 shows an integrated circuit manufacturing system for generating an integrated circuit embodying a compression unit or a decompression unit.

FIG. 15 shows an example of an integrated circuit (IC) manufacturing system 1502 which is configured to manufacture a compression and/or decompression unit as described in any of the examples herein. In particular, the IC manufacturing system 1502 comprises a layout processing system 1504 and an integrated circuit generation system 1506. The IC manufacturing system 1502 is configured to receive an IC definition dataset (e.g. defining a compression and/or decompression unit as described in any of the examples herein), process the IC definition dataset, and generate an IC according to the IC definition dataset (e.g. which embodies a compression and/or decompression unit as described in any of the examples herein). The processing of the IC definition dataset configures the IC manufacturing system 1502 to manufacture an integrated circuit embodying a compression and/or decompression unit as described in any of the examples herein.

The layout processing system 1504 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1504 has determined the circuit layout it may output a circuit layout definition to the IC generation system 1506. A circuit layout definition may be, for example, a circuit layout description.

The IC generation system 1506 generates an IC according to the circuit layout definition, as is known in the art. For example, the IC generation system 1506 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1506 may be in the form of computer-readable code which the IC generation system 1506 can use to form a suitable mask for use in generating an IC.

The different processes performed by the IC manufacturing system 1502 may be implemented all in one location, e.g. by one party. Alternatively, the IC manufacturing system 1502 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a compression and/or decompression unit without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 15 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 15, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of compressing, into a block of compressed data, a block of sub-primitive presence indications for use in a rendering system, wherein the block of sub-primitive presence indications is subdivided into a plurality of parent regions, each of the parent regions being subdivided into a plurality of child regions, the method comprising:
identifying a presence state for each of the child regions based on the sub-primitive presence indications in the block of sub-primitive presence indications; and
storing, in the block of compressed data, a hierarchical representation of the block of sub-primitive presence indications, wherein:
for each of one or more parent regions whose child regions all have the same identified presence state, parent-level data is included in the hierarchical representation to represent the presence state of the parent region without child-level data for the child regions within the parent region being included in the hierarchical representation, and
for each of one or more parent regions whose child regions do not all have the same identified presence state, child-level data for the child regions within the parent region is included in the hierarchical representation to represent the presence states for the child regions within the parent region.

2. The method of claim 1, wherein each of the child regions corresponds with a respective one of the sub-primitive presence indications in the block of sub-primitive presence indications, wherein said identifying a presence state for each of the child regions comprises reading the corresponding sub-primitive presence indication from the block of sub-primitive presence indications.

3. The method of claim 1, wherein each of the presence indications in the block of sub-primitive presence indications indicates a presence state which is one of: (i) fully present, (ii) fully absent, and (iii) partially present.

4. The method of claim 3, wherein parent-level data representing a presence state of a parent region indicates that:
(i) all of the child regions within the parent region are fully present,
(ii) all of the child regions within the parent region are fully absent,
(iii) all of the child regions within the parent region are partially present, or
(iv) the child regions within the parent region have a mix of presence states.

5. The method of claim 3, wherein child-level data representing a presence state of a child region indicates that:
(i) the child region is fully present,
(ii) the child region is fully absent, or
(iii) the child region is partially present.

6. The method of claim 1, further comprising, if an initial hierarchical representation of the block of sub-primitive presence indications has more than a threshold number of bits, changing one or more of the sub-primitive presence states to be partially present, and determining another hierarchical representation of the block of sub-primitive presence indications that does not have more than the threshold number of bits.

7. The method of claim 1, wherein each of the parent regions has four child regions within it.

8. The method of claim 7, further comprising, for each of the one or more parent regions whose child regions do not all have the same identified presence state, ensuring that three of the child regions within the parent region have the same presence state as each other.

9. The method of claim 8, wherein said ensuring that three of the child regions within the parent region have the same presence state as each other comprises setting a presence state to be partially present for one or more child regions which initially had a presence state of fully present or fully absent.

10. The method of claim 7, wherein for each of the one or more parent regions whose child regions do not all have the same identified presence state, the child-level data for the four child regions within the parent region comprises:
(a) a palette indication to indicate that one of:
   (i) a majority of the four child regions have a partially present presence state and a minority of the four child regions have a fully present presence state,
   (ii) a majority of the four child regions have a partially present presence state and a minority of the four child regions have a fully absent presence state,
   (iii) a majority of the four child regions have a fully present presence state and a minority of the four child regions have a partially present presence state, and
   (iv) a majority of the four child regions have a fully absent presence state and a minority of the four child regions have a partially present presence state; and
(b) a minority position indication to indicate the position of said minority of the four child regions within the parent region.

11. The method of claim 1, wherein the block of sub-primitive presence indications is subdivided into a plurality of grandparent regions, wherein each of the grandparent regions is subdivided into a respective plurality of the parent regions.

12. The method of claim 11, wherein for each of one or more grandparent regions whose parent regions all have child regions within them which all have the same identified presence state, grandparent-level data is included in the hierarchical representation to represent the presence state of the grandparent region without parent-level data or child-level data for the parent regions or child regions within the grandparent region being included in the hierarchical representation.

13. The method of claim 12, wherein grandparent-level data representing a presence state of a grandparent region indicates that:
(i) all of the child regions within all of the parent regions within the grandparent region are fully present,
(ii) all of the child regions within all of the parent regions within the grandparent region are fully absent,
(iii) all of the child regions within all of the parent regions within the grandparent region are partially present,
(iv) all of the child regions within the parent regions within the grandparent region are either fully present or partially present,
(v) all of the child regions within the parent regions within the grandparent region are either fully absent or partially present, or
(vi) the child regions within the parent regions within the grandparent region have a mix of fully present, fully absent and partially present presence states.

14. The method of claim 13, wherein for a parent region within a grandparent region whose grandparent-level data indicates that (iv) all of the child regions within the parent regions within the grandparent region are either fully present or partially present, parent-level data representing a presence state of the parent region indicates that:
(i) all of the child regions within the parent region are fully present,
(ii) all of the child regions within the parent region are partially present, or
(iii) the child regions within the parent region have a mix of fully present and partially present presence states.

15. The method of claim 13, wherein for a parent region within a grandparent region whose grandparent-level data indicates that (v) all of the child regions within the parent regions within the grandparent region are either fully absent or partially present, parent-level data representing a presence state of the parent region indicates that:
(i) all of the child regions within the parent region are fully absent,
(ii) all of the child regions within the parent region are partially present, or
(iii) the child regions within the parent region have a mix of fully absent and partially present presence states.

16. The method of claim 13, wherein for a parent region within a grandparent region whose grandparent-level data indicates that (vi) the child regions within the parent regions within the grandparent region have a mix of fully present, fully absent and partially present presence states, parent-level data representing a presence state of the parent region indicates that:
(i) all of the child regions within the parent region are fully present,
(ii) all of the child regions within the parent region are fully absent,
(iii) all of the child regions within the parent region are partially present,
(iv) the child regions within the parent region have a mix of fully present and partially present presence states, or
(v) the child regions within the parent region have a mix of fully absent and partially present presence states.

17. The method of claim 14, wherein:
for a child region within a parent region whose parent-level data indicates that the child regions within the parent region have a mix of fully present and partially present presence states, child-level data representing a presence state of the child region indicates whether the child region has a fully present or partially present presence state, and
for a child region within a parent region whose parent-level data indicates that the child regions within the parent region have a mix of fully absent and partially present presence states, child-level data representing a presence state of the child region indicates whether the child region has a fully absent or partially present presence state.

18. The method of claim 1, wherein the rendering system is a ray tracing system or a rasterization system.

19. A compression unit configured to compress, into a block of compressed data, a block of sub-primitive presence indications for use in a rendering system, wherein the block of sub-primitive presence indications is subdivided into a plurality of parent regions, each of the parent regions being subdivided into a plurality of child regions, the compression unit being configured to:
identify a presence state for each of the child regions based on the sub-primitive presence indications in the block of sub-primitive presence indications; and
store, in the block of compressed data, a hierarchical representation of the block of sub-primitive presence indications, wherein:
for each of one or more parent regions whose child regions all have the same identified presence state, parent-level data is included in the hierarchical representation to represent the presence state of the parent region without child-level data for the child regions within the parent region being included in the hierarchical representation, and for each of one or more parent regions whose child regions do not all have the same identified presence state, child-level data for the child regions within the parent region is included in the hierarchical representation to represent the presence states for the child regions within the parent region.

20. A non-transitory computer readable storage medium having stored thereon an integrated circuit definition dataset that, when processed in an integrated circuit manufacturing system, configures the integrated circuit manufacturing system to manufacture a compression unit configured to compress, into a block of compressed data, a block of sub-primitive presence indications for use in a rendering system, wherein the block of sub-primitive presence indications is subdivided into a plurality of parent regions, each of the parent regions being subdivided into a plurality of child regions, the compression unit being configured to:

identify a presence state for each of the child regions based on the sub-primitive presence indications in the block of sub-primitive presence indications; and store, in the block of compressed data, a hierarchical representation of the block of sub-primitive presence indications, wherein:

for each of one or more parent regions whose child regions all have the same identified presence state, parent-level data is included in the hierarchical representation to represent the presence state of the parent region without child-level data for the child regions within the parent region being included in the hierarchical representation, and for each of one or more parent regions whose child regions do not all have the same identified presence state, child-level data for the child regions within the parent region is included in the hierarchical representation to represent the presence states for the child regions within the parent region.

* * * * *